US012804481B2

(12) United States Patent
Wu et al.

(10) Patent No.: US 12,804,481 B2
(45) Date of Patent: Nov. 17, 2026

(54) MANAGING CONDITIONAL SECONDARY NODE CHANGE

(71) Applicant: GOOGLE LLC, Mountain View, CA (US)

(72) Inventors: Chih-Hsiang Wu, Taoyuan City (TW); Ching-Jung Hsieh, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 221 days.

(21) Appl. No.: 18/559,331

(22) PCT Filed: May 5, 2022

(86) PCT No.: PCT/US2022/027821
§ 371 (c)(1),
(2) Date: Nov. 6, 2023

(87) PCT Pub. No.: WO2022/235899
PCT Pub. Date: Nov. 10, 2022

(65) Prior Publication Data

US 2024/0236777 A1 Jul. 11, 2024

Related U.S. Application Data

(60) Provisional application No. 63/247,984, filed on Sep. 24, 2021, provisional application No. 63/185,089, filed on May 6, 2021.

(51) Int. Cl.
*H04W 36/00* (2009.01)
*H04W 36/38* (2009.01)

(52) U.S. Cl.
CPC .................. *H04W 36/0069* (2018.08); *H04W 36/008357* (2023.05); *H04W 36/38* (2013.01)

(58) Field of Classification Search
CPC ............. H04W 36/0069; H04W 36/00; H04W 36/008357; H04W 36/38
See application file for complete search history.

(56) References Cited

U.S. PATENT DOCUMENTS

| | | | |
|---|---|---|---|
| 2018/0279193 | A1 | 9/2018 | Park et al. |
| 2021/0105681 | A1 | 4/2021 | Paladugu et al. |
| 2021/0136638 | A1 | 5/2021 | Paladugu et al. |

FOREIGN PATENT DOCUMENTS

| | | | |
|---|---|---|---|
| JP | 2021-505023 | A | 2/2021 |
| WO | WO-2019/101162 | A1 | 5/2019 |

(Continued)

OTHER PUBLICATIONS

3GPP TS 38.423, Retrieved from the Internet: URL:ftp://ftp.3gpp.org/Specs/archive/38_series/38.423/38423-g30.zip 38423-930.doc; Oct. 2, 2020 (Oct. 2, 2020). (Year: 2020).*

(Continued)

*Primary Examiner* — Tuan H Nguyen
(74) *Attorney, Agent, or Firm* — MARSHALL, GERSTEIN & BORUN LLP

(57) ABSTRACT

A base station can perform various methods for supporting a secondary node (SN) procedure. In one example, a first base station, operating as (i) a source SN, (ii) a target SN, or (iii) a candidate SN for the SN procedure, performs a method including: communicating a message with a second base station, operating as a master node (MN), to perform the SN procedure; and determining, based on whether the SN procedure is a conditional procedure or a non-conditional procedure, whether to start a timer in response to the communicating.

20 Claims, 19 Drawing Sheets

(56) References Cited

FOREIGN PATENT DOCUMENTS

| | | | |
|---|---|---|---|
| WO | WO-2021/067830 | A1 | 4/2021 |
| WO | WO-2021/163661 | A1 | 8/2021 |

OTHER PUBLICATIONS

3GPP TS 38.423, Retrieved from the Internet: URL:ftp://ftp.3gpp.org/Specs/archive/36_series/36.423/36423-g30.zip 36423-930.doc ; Oct. 2, 2020 (Oct. 2, 2020). (Year: 2020).*

"3rd Generation Partnership Project; Technical Specification Group Radio Access Network; Evolved Universal Terrestrail Radio Access Network (E-UTRAN); X2 Application Protocol (X2AP) (Release 16)," 3GPP Standard (Oct. 2, 2020).

"3rd Generation Partnership Project; Technical Specification Group Radio Access Network; NG-RAN; Xn Application Protocol (XnAP) (Release 16)," 3GPP Standard (Oct. 2, 2020).

"LTE; Evolved Universal Terrestrial Radio Access Network (E_UTRAN); X2 Application Protocol (X2AP)," 3GPP TS 36.423 V12.7.0 (2015).

CATT, "[Post111-e][920][eDCCA] Conditional PSCell Change and Addition," 3GPP TSG-RAN WG2 Meeting #112 (2020).

Intel Corporation, "(TP for NR_Mob_enh-Core BL CR for TS 38.423): Correction and Resolving FFS on Inter-gNB-DU Conditional Mobility Scenarios," 3GPP Draft (Apr. 10, 2020).

Intel Corporation, "Summary for CB: #17_Email_MobEnh_CHO_CondPSCell_General," 3GPP Draft (May 4, 2020).

International Search Report and Written Opinion for Application No. PCT/US2022/027821, dated Aug. 10, 2022.

Google, "(TP for LTE_feMob BL CR for TS 36.423) RRC Reconfiguration Complete for CPC," 3GPP TSG-RAN WG3 Meeting #107bis-E (2020).

Office Action for Japanese Application No. 2023-568374, dated Feb. 25, 2025.

"3rd Generation Partnership Project; Technical Specification Group Radio Access Network; NG-RAN; Architecture description (Release 16)," 3GPP TS 38.401 V16.0.0 (2019).

"3rd Generation Partnership Project; Technical Specification Group Radio Access Network; NR; NR and NG-RAN Overall Description; Stage 2 (Release 16)," 3GPP TS 38.300 V16.0.0 (2019).

"3rd Generation Partnership Project; Technical Specification Group Radio Access Network; NR; Radio Resource Control (RRC) protocol specification (Release 16)," 3GPP TS 38.331 V16.0.0 (2020).

"LTE; Evolved Universal Terrestrial Radio Access (E-UTRA); LTE-WLAN Aggregation Adaptation Protocol (LWAAP) specification (3GPP TS 36.360 version 16.0.0 Release 16)," ETSI TS 136 360 V16.0.0 (2020).

"Universal Mobile Telecommunications System (UMTS); LTE; 5G; NR; Multi-connectivity; Overall description; Stage-2 (3GPP TS 37.340 version 16.10.0 Release 16)," ETSI TS 137 340 V16.10.0 (2022).

* cited by examiner

MANAGING CONDITIONAL SECONDARY NODE CHANGE

FIELD OF THE DISCLOSURE

This disclosure relates generally to wireless communications and, more particularly, to conditional procedures such as conditional secondary node addition or change procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG and the SCG can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE transfers a wireless connection from one base station to another base station. For example, a serving base station can determine to hand the UE over to a target base station and initiate a handover procedure.

3GPP specification TS 37.340 v16.1.0 describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These legacy procedures, which do not involve conditions that are checked at the UE, can be referred to as "immediate" SN addition and SN change procedures.

More recently, for both SN or PSCell addition/change, "conditional" procedures have been considered (i.e., conditional SN or PSCell addition/change). Unlike the "immediate" procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., one or more random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

In the conditional PSCell addition or change procedure, the RAN (i.e., MN or SN) transmits an RRC reconfiguration message including one or more configuration parameters to the UE and the UE attempts to connect to a candidate PSCell configured by the RRC reconfiguration message. After the UE successfully connects to the SN via the candidate PSCell, the UE communicates with the SN on the candidate PSCell by using the one or more configuration parameters and security key(s) associated to the candidate PSCell and derived from one or more security configuration parameters in the RRC reconfiguration message. The SN also derives security key(s), which match the security key(s) derived at the UE. After the UE successfully connects to the candidate PSCell, the RAN (i.e., SN) communicates data with the UE by using the matching security key(s) and the one or more configuration parameters.

SN-initiated conditional SN change procedures present challenges for coordination between the MN, a source SN, and a candidate SN. In contrast to conditional handover, conditional SN addition, or MN-initiated conditional SN change procedures, in SN-initiated conditional SN change procedures the condition(s) corresponding to the candidate cell(s) may be provided by the source SN. As a result, the MN may be unable to interpret the SN-initiated conditional SN change condition(s). For example, the condition may be formatted in accordance with a protocol not supported by the MN. Further, in contrast to an immediate SN-initiated procedure, a single SN-initiated conditional SN change procedure may prepare multiple PSCells at a candidate SN. To account for these differences, enhancements are desired to enable cooperation between the MN, source SN, and candidate SN during SN-initiated conditional SN change procedures.

DETAILED DESCRIPTION OF THE DRAWINGS

Figure 1A:
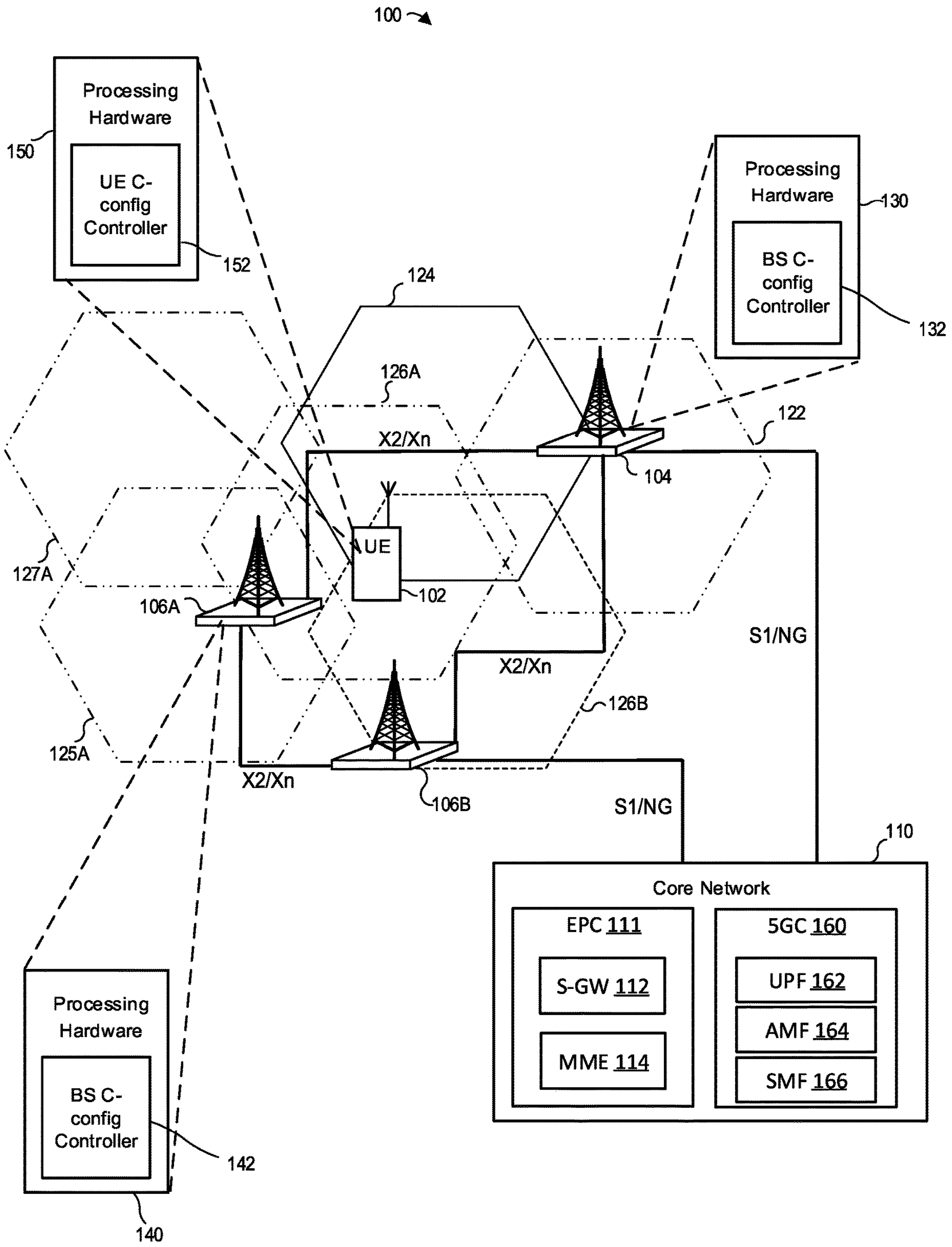
FIG. 1A is a block diagram of an example system in which a radio access network (RAN) and a user equipment (UE) can implement the techniques of this disclosure for managing conditional procedures related to a secondary node (SN)

A base station operating as an MN or an SN can implement the techniques of this disclosure to support SN procedures, and, in particular, SN-initiated conditional SN change procedures.

To initiate a conditional SN change procedure, a source SN (S-SN) identifies a candidate SN (C-SN) and sends an indication of at least one cell operated by the C-SN to the MN. In some implementations, the S-SN includes, with the indication of the cell, a condition for connecting to the cell. In response, the MN requests from the C-SN a C-SN configuration for communicating with the C-SN via the cell. The MN may but might not decode the condition and/or the C-SN configuration. For example, the MN can assign a configuration identifier (ID) to the cell, such that the MN can identify the condition and the C-SN configuration for the cell, without decoding the content of the condition or the C-SN configuration. The MN can then transmit the configuration ID, condition, and C-SN configuration to the UE.

In other implementations, the S-SN refrains from transmitting, with the indication of the cell, the condition for connecting to the C-SN cell. In such implementations, after the MN receives the C-SN configuration from the C-SN, the MN can send the C-SN configuration to the S-SN. The S-SN can then transmit the configuration and the condition to the UE, via the MN. The S-SN can include the configuration and the condition in an information element (IE) that is readable by the UE, and the MN is not required to decode the configuration or the condition. The SN can also assign a configuration ID to the cell and include the configuration ID in the IE.

Further, the MN, S-SN, and C-SN can also implement the techniques of this disclosure to modify S-SN and C-SN configurations. For example, if the MN or S-SN determines to modify the S-SN configuration, the MN can request from the C-SN a C-SN configuration that is updated to reflect the modifications to the S-SN configuration. As another example, if the MN determines to release the SN, the MN can also trigger release of the C-SN.

Moreover, techniques of this disclosure also relate to determining whether to start a timer related to an SN procedure, or which actions to perform upon expiry of such a timer, based on whether or not the SN procedure is a conditional SN conditional procedure.

Generally speaking, the techniques of this disclosure allow a first base station to configure multiple conditional configurations for a UE that may be related to multiple candidate cells of a second base station (which can be the same or different from the first base station), along with one or more conditions to be satisfied before the UE connects to a particular candidate cell. The techniques also allow a base station to determine which conditional configuration and associated security key(s) to apply to communicate with the UE on the particular candidate cell. The conditional procedure can be for example a conditional handover procedure, a conditional SN addition or change procedure, or a conditional PSCell addition or change procedure. In the discussion below, the term "CPAC" can be used to refer to conditional PSCell addition or change without SN change. The term "CSAC" can be used to refer to conditional SN addition or change.

FIG. 1A depicts an example wireless communication system 100 in which communication devices can implement the techniques of this disclosure. The wireless communication system 100 includes a UE 102, a base station 104, a base station 106A, a base station 106B and a core network (CN) 110. The UE 102 initially connects to the base station 104.

In some scenarios, the base station 104 can perform immediate SN addition to configure the UE 102 to operate in dual connectivity (DC) with the base station 104 and the base station 106B. The base stations 104 and 106B operate as an MN and an SN for the UE 102, respectively. Later on, the MN 104 can perform an immediate SN change to change the SN of the UE 102 from the base station 106B (source SN, or "S-SN") to the base station 106A (target/candidate SN, or "T-SN/C-SN") while the UE 102 is in DC with the MN 104 and the S-SN 106B.

In other scenarios, the base station 104 can perform a conditional SN Addition procedure to first configure the base station 106A as a candidate SN (C-SN) for the UE 102. At this time, the UE 102 can be in single connectivity (SC) with the base station 104 or in DC with the base station 104 and another base station 106B. In contrast to the immediate SN Addition case discussed above, the UE 102 does not immediately attempt to connect to the C-SN 106A. In this scenario, the base station 104 again operates as an MN, but the base station 106A initially operates as a C-SN rather than an SN.

More particularly, when the UE 102 receives a configuration for the C-SN 106A, the UE 102 does not connect to the C-SN 106A until the UE 102 has determined that a certain condition is satisfied. In some cases, the UE 102 in some cases considers multiple conditions. For convenience only the discussion below refers to a single condition. When the UE 102 determines that the condition has been satisfied, the UE 102 connects to the C-SN 106A, so that the C-SN 106A begins to operate as the SN 106A for the UE 102. Thus, while the base station 106A operates as a C-SN rather than an SN, the base station 106A is not yet connected to the UE 102, and accordingly is not yet serving the UE 102.

In some scenarios, the condition associated with conditional SN addition can be signal strength/quality, which the UE 102 detects on a candidate primary secondary cell (PSCell) of the C-SN 106A, exceeding a certain threshold or otherwise corresponding to an acceptable measurement. For example, when the one or more measurement results the UE 102 obtains on the candidate PSCell (C-PSCell) are above a threshold configured by the MN 104 or above a pre-determined or pre-configured threshold, the UE 102 determines that the condition is satisfied. When the UE 102 determines that the signal strength/quality on C-PSCell of the C-SN 106A is sufficiently good (again, measured relative to one or more quantitative thresholds or other quantitative metrics), the UE 102 can perform a random access procedure with the C-SN 106A to connect to the candidate SN 106A. After the UE 102 successfully completes the random access procedure, the base station 106A begins to operate as an SN, and the C-PSCell becomes a PSCell for the UE 102. The SN 106A then can start communicating data with the UE 102.

In various configurations of the wireless communication system 100, the base station 104 can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104 and the base station 106A or 106B (106A/B) via the same RAT such as EUTRA or NR, or different RATs. When the base station 104 is an MeNB and the base station 106A is a SgNB, the UE 102 can be in EUTRA-NR DC (EN-DC) with the MeNB and the SgNB. In this scenario, the MeNB 104 might or might not configure the base station 106B as a C-SgNB to the UE 102. When the base station 104 is an MeNB and the base station 106A is a C-SgNB for the UE 102, the UE 102 can be in SC with the MeNB. In this scenario, the MeNB 104 might or might not configure the base station 106B as another C-SgNB to the UE 102.

In some cases, an MeNB, an SeNB or a C-SgNB is implemented as an ng-cNB rather than an eNB. When the base station 104 is a Master ng-cNB (Mng-eNB) and the base station 106A is a SgNB, the UE 102 can be in next generation (NG) EUTRA-NR DC (NGEN-DC) with the Mng-eNB and the SgNB. In this scenario, the MeNB 104 might or might not configure the base station 106B as a C-SgNB to the UE 102. When the base station 104 is an Mng-NB and the base station 106A is a C-SgNB for the UE 102, the UE 102 can be in SC with the Mng-NB. In this scenario, the Mng-eNB 104 might or might not configure the base station 106B as another C-SgNB to the UE 102.

When the base station 104 is an MgNB and the base station 106A/B is an SgNB, the UE 102 may be in NR-NR DC (NR-DC) with the MgNB and the SgNB. In this scenario, the MeNB 104 might or might not configure the base station 106B as a C-SgNB to the UE 102. When the base station 104 is an MgNB and the base station 106A is a C-SgNB for the UE 102, the UE 102 may be in SC with the MgNB. In this scenario, the MgNB 104 might or might not configure the base station 106B as another C-SgNB to the UE 102.

When the base station 104 is an MgNB and the base station 106A/B is a Secondary ng-eNB (Sng-eNB), the UE 102 may be in NR-EUTRA DC (NE-DC) with the MgNB and the Sng-CNB. In this scenario, the MgNB 104 might or might not configure the base station 106B as a C-Sng-eNB to the UE 102. When the base station 104 is an MgNB and the base station 106A is a candidate Sng-eNB (C-Sng-eNB) for the UE 102, the UE 102 may be in SC with the MgNB. In this scenario, the MgNB 104 might or might not configure the base station 106B as another C-Sng-eNB to the UE 102.

In scenarios in which the UE 102 hands over from the base station 104 to the base station 106A, the base stations 104 and 106A operate as the source base station (S-BS) and a target base station (T-BS), respectively. When the handover is conditional, the base station 106A operates as a conditional T-BS (C-T-BS) or simply C-BS. The UE 102 can operate in DC with the base station 104 and a base station 106B for example prior to the handover, and continue to operate in DC with the base station 106A, and the base station 106B or another base station (not shown in FIG. 1A), after completing the handover. The base stations 104 and 106A in this case operate as a source MN (S-MN) and a target MN (T-MN), respectively, provided the handover is immediate. When the handover is conditional, the base station 106A operates as a conditional T-MN (C-T-MN) or simply C-MN.

The base stations 104, 106A, and 106B can connect to the same core network (CN) 110, which can be an evolved packet core (EPC) 111 or a fifth-generation core (5GC) 160. The base station 104 can be implemented as an eNB supporting an SI interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an SI interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, the base station 106A supports a cell 126A, and the base station 106B supports a cell 126B. The cells 124 and 126A can partially overlap, as can the cells 124 and 126B, so that the UE 102 can communicate in DC with the base station 104 (operating as an MN) and the base station 106A (operating as an SN) and, upon completing an SN change, with the base station 104 (operating as MN) and the SN 106B. The base station 106A can also support additional cells 125A and 127A. More particularly, when the UE 102 is in DC with the base station 104 and the base station 106A, the base station 104 operates as an MeNB, an Mng-eNB or an MgNB, and the base station 106A operates as an SgNB or an Sng-eNB. When the UE 102 is in SC with the base station 104, the base station 104 operates as an MeNB, an Mng-eNB or an MgNB, and the base station 106A operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G D C.

With continued reference to FIG. 1A, the base station 104 includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1 includes a conditional configuration controller 132 that is configured to manage or control the conditional configuration techniques of this disclosure. For example, the conditional configuration controller 132 may be configured to support RRC messaging associated with immediate and conditional handover procedures, and/or to support the necessary operations when the base station 104 operates as an MN relative to an SN. Moreover, in some implementations and/or scenarios, the conditional configuration controller 132 may be responsible for maintaining (for the UE 102 and a number of other UEs not shown in FIG. 1) current sets of conditional configurations in accordance with various implementations discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1 includes a conditional configuration controller 142 that is configured to manage or control RRC procedures and RRC configurations. For example, the conditional configuration controller 142 may be configured to support RRC messaging associated with immediate and conditional handover procedures, and/or to support the necessary operations when the base station 106A operates as MN, an SN, a candidate MN (C-MN) and/or candidate SN (C-SN). Moreover, in some implementations and/or scenarios, the conditional configuration controller 142 may be responsible for maintaining (for the UE 102 and a number of other UEs not shown in FIG. 1) current sets of conditional configurations in accordance with various implementations discussed below. The base station 106B may include processing hardware similar to the processing hardware 140 of the base station 106A.

Although FIG. 1A illustrates the conditional configuration controllers 132 and 142 as operating in an MN and an SN, respectively, a base station generally can operate as an MN, an SN, a candidate MN or a candidate SN in different scenarios. Thus, the MN 104, the SN 104A, and the SN 106B can implement similar sets of functions and support both MN, SN, conditional MN and conditional SN operations.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1 includes a conditional configuration controller 152 that is configured to manage or control RRC procedures and RRC configurations related to conditional configurations. For example, the conditional configuration controller 152 may be configured to support RRC messaging associated with immediate and conditional handover and/or secondary node addition/modification procedures, and may also be responsible for maintaining a current set of conditional configurations for the UE 102 (e.g., adding, releasing or modifying conditional configurations as needed) in accordance with any of the implementations discussed below.

In operation, the UE 102 can use a radio bearer (e.g., a DRB or an SRB) that at different times terminates at the MN 104 or the SN 106A. The UE 102 can apply one or more security keys when communicating on the radio bearer, in the uplink (from the UE 102 to a base station) and/or downlink (from a base station to the UE 102) direction.

Figure 1B:
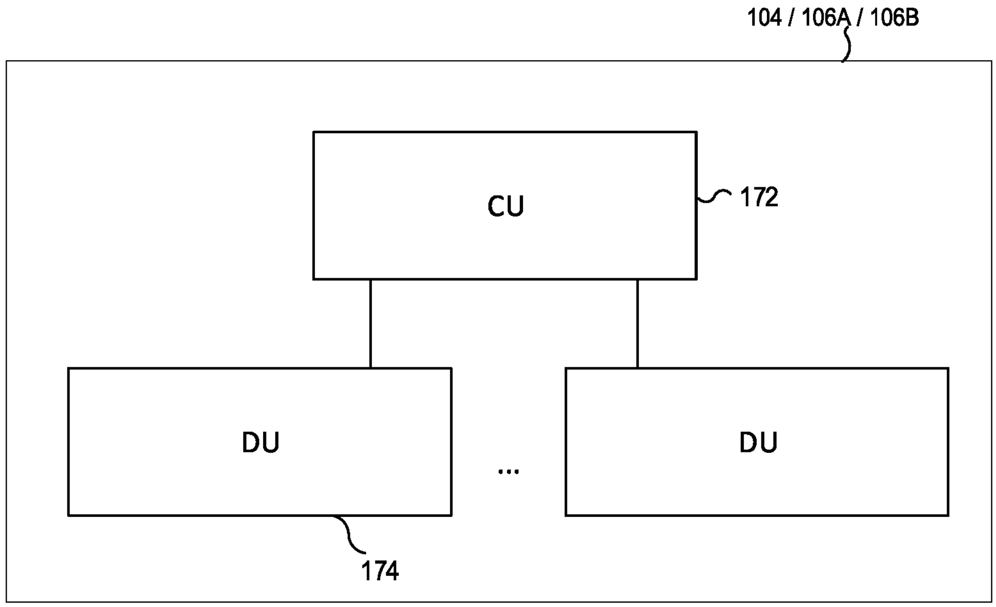
FIG. 1B is a block diagram of an example base station in which a central unit (CU) and a distributed unit (DU) that can operate in the system of FIG. 1A.

FIG. 1B depicts an example distributed implementation of any one or more of the base stations 104, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 104, 106A, or 106B operates as an MN, an SN or a candidate SN (C-SN). The processing hardware may include further a physical layer controller configured to manage or control one or more physical layer operations or procedures.

Figure 2:
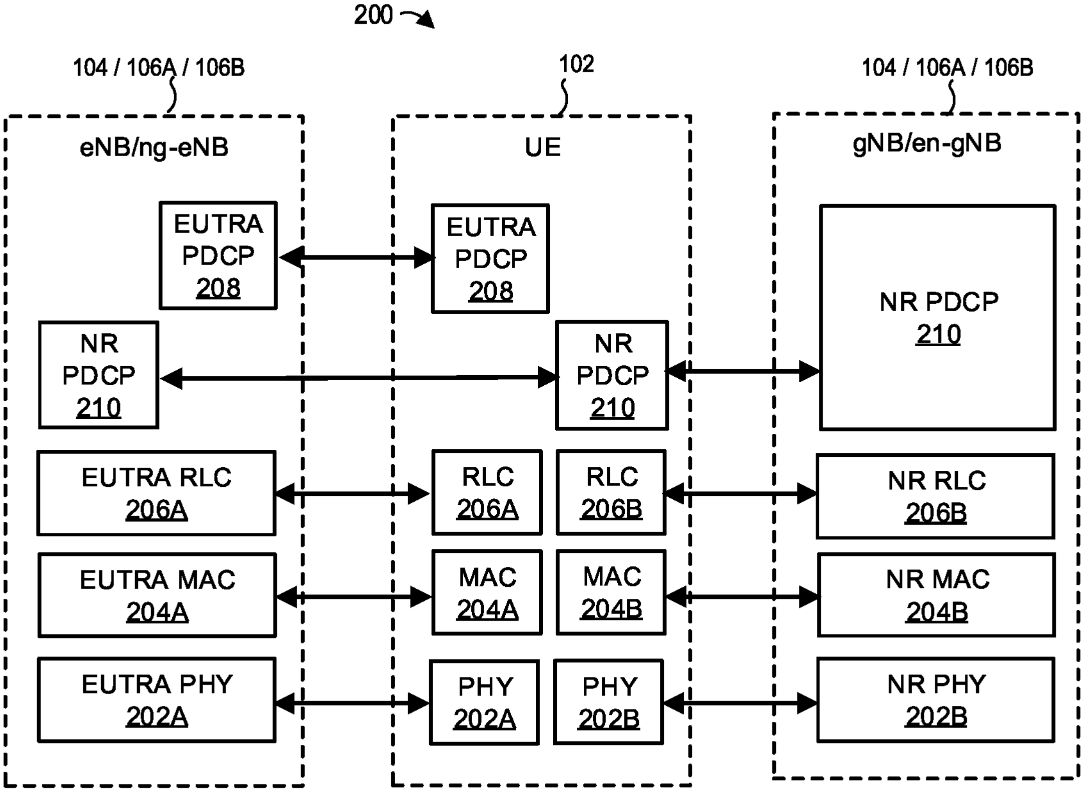
FIG. 2 is a block diagram of an example protocol stack according to which the UE of FIG. 1 communicates with base stations.

Next. FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the base station 104 operating as a MeNB and the base station 106A or 106B operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Next, several example scenarios in which a base station acting as an SN initiates a conditional SN change procedure are discussed with reference to FIGS. 3A-3G. In the scenarios depicted by FIGS. 3A-3G, a base station configures the UE with conditional configuration(s) provided by a target/candidate SN. (In this disclosure, the terms target and candidate can be interchanged, such that "target SN" and "candidate SN" both refer to the SN that prepares the conditional SN configuration(s), where a conditional SN configuration is applicable only when the trigger condition is met.) Generally speaking, similar events in FIGS. 3A-3G are labeled with the same reference numbers, with differences discussed below where appropriate. With the exception of the differences shown in the figures and discussed below, any of the alternative implementations and examples discussed with respect to a particular event (e.g., for messaging and processing) may apply to events labeled with similar reference numbers in other figures.

Figure 3A:
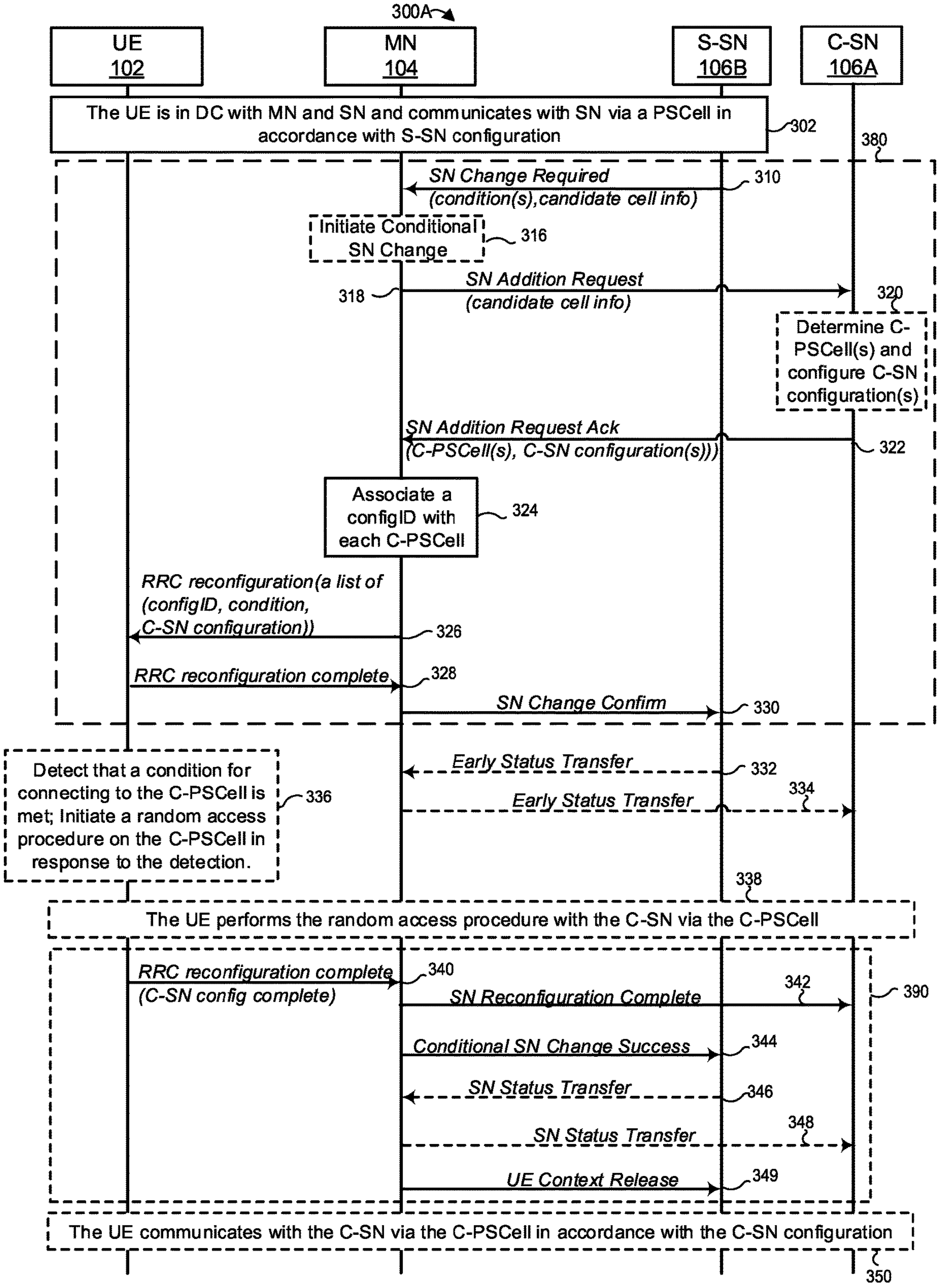
FIG. 3A is a messaging diagram of an example scenario in which a source SN (S-SN) initiates a conditional SN change procedure by providing, to a master node (MN), conditions for connecting to respective C-PSCells of a candidate SN (C-SN), and the MN requests conditional configurations for the C-PSCells from the candidate SN, assigns a configuration identifier (ID) to each of the C-PSCells, and transmits the configuration IDs, conditions, and conditional configurations to a UE.

Referring first to FIG. 3A, in a scenario 300A, the base station 104 operates as an MN, the base station 106B operates as a source SN (S-SN), and the base station 106A operates as a candidate SN (C-SN). Initially, the UE 102 (operating in DC) communicates 302 data (e.g., uplink and/or downlink data PDUs) with the MN 104 (via cell 124), e.g., according to an MN configuration, and communicates 302 data (e.g., uplink and/or downlink data PDUs) with the SN 106B (via cell 126B) according to a source SN configuration (S-SN config).

The S-SN 106B at some point determines that it should prepare a conditional SN change to a candidate SN (e.g., C-SN 106A) with candidate cells (or frequency bands) for the UE 102 as potential C-PSCell(s) (e.g., cells 125A, 126A, and/or 127A). The S-SN 106B can make this determination based on one or more measurement results received from the UE 102, for example, or another suitable event, or even blindly. In response to this determination, the S-SN 106B sends 310, to the MN 104, an SN Change Required (e.g., SGNB CHANGE REQUIRED or S-NODE CHANGE REQUIRED) message including a C-SN ID (e.g., Global NG-RAN Node ID or Global en-gNB ID), condition(s) (e.g., condition 1, condition 2, and/or condition 3), and/or candidate cell information indicating the potential C-PSCell(s). The S-SN 106B generates the condition(s).

In some implementations, the S-SN 106B can include a conditional configuration indication in the SN Change Required message, which instructs the MN 104 to perform a conditional SN change procedure (i.e., inter-SN conditional PSCell change (CPC) procedure). In other implementations, the S-SN 106B might not include a conditional configuration indication in the SN Change Required message. In such cases, the MN 104 can implicitly determine that the SN Change Required message is for a conditional SN change if the MN 104 identifies the condition(s) or the potential C-PSCell(s) in the SN Change Required message. In some implementations, the C-SN ID can be renamed as a target SN ID. In some implementations, the S-SN 106B may include an S-SN configuration in the SN Change Required message. The S-SN configuration includes configuration parameters that the S-SN 106B has transmitted to the UE 102 directly or indirectly via the MN 104. In other implementations, the S-SN 106B does not include the S-SN configuration in the SN Change Required message. There is an association between a particular condition and a particular potential C-PSCell. The association can be specified in a 3GPP specification, for example. Table 1 is an example of the association between the potential C-PSCell(s) and the condition(s).

TABLE 1

Example of the association between the potential C-PSCell(s) and the condition(s)

| Potential C-PSCell(s) in the candidate cell information | Condition(s) |
|---|---|
| (Cell ID of) cell 125A | Condition 1 |
| (Cell ID of) cell 126A | Condition 2 |
| (Cell ID of) cell 127A | Condition 3 |

In some implementations, the S-SN 106B can include the particular condition (e.g., condition 1, condition 2, and/or condition 3) for each of the potential C-PSCell(s) (e.g., cell 125A, cell 126A and/or cell 127A) in a condition list (e.g., condExecutionCondList field or IE) and indicates the potential C-PSCell(s) in a candidate cell information list (e.g., the candidateCellInfoListSN field or IE or a newly defined list field or IE). The association between a particular condition in the condition list and a particular potential C-PSCell in the candidate cell information list can specified by the numbering order in the condition list and the candidate cell information list. For example, the first entry (e.g., condition 1) of the condition list is associated with the first entry (e.g., cell ID(s) of cell 125A) of the candidate cell information list, the second entry (e.g., condition 2) of the condition list is associated with the second entry (e.g., cell ID(s) of cell 126A) of the candidate cell information list, the third entry (e.g., condition 3) of the condition list is associated with the third entry (e.g., cell ID(s) of cell 127A) of the candidate cell information list, and so on.

In other implementations, the S-SN 106B can use a single list (e.g., the candidateCellInfoListSN field or IE or a newly defined list field or IE) to include the condition(s) and the candidate cell information. For example, each entry of the list includes a particular condition in the condition(s) and includes cell ID(s) of a particular potential C-PSCell in the candidate cell information list. Thus, the association between a particular condition in the condition(s) and a particular potential C-PSCell in the candidate cell information can be indicated by the entry index.

In some implementations, each condition in the condition(s) or the condition list can be defined as an OCTET STRING, so that the condition is transparent to the MN 104 and the MN 104 does not need to decode the condition.

In some implementations, each of the condition(s) provided by the S-SN 106B may contain a measurement identity associated to a measurement configuration that the S-SN 106B provided to the UE 102 during event 302. The S-SN 106B can include the measurement configuration(s) in the S-SN configuration. In some implementations, the candidate cell information may contain a list of measurement results where each measurement result corresponds to a particular potential C-PSCell.

In response to the SN Change Required message, the MN 104 may initiate 316 a conditional SN change procedure as required by the S-SN 106B. The MN 104 sends 318, to the C-SN 106A, an SN Addition Request (e.g., SGNB ADDITION REQUEST or S-NODE ADDITION REQUEST) message including the candidate cell information. The C-SN 106A determines (e.g., selects) 320 C-PSCell(s) from the potential C-PSCell(s) in the candidate cell information and configures a particular C-SN configuration corresponding to each determined C-PSCell. In some implementations, the C-SN 106A can determine the C-PSCell(s) as a subset of the potential C-PSCell(s). In other implementations, the C-SN 106A can determine the C-PSCell(s) identical to the potential C-PSCell(s). In response to the SN Addition Request message, the C-SN 106A sends 322, to the MN 104, an SN Addition Request Acknowledge (e.g., SGNB ADDITION REQUEST ACKNOWLEDGE or S-NODE ADDITION REQUEST ACKNOWLEDGE) message including cell ID(s) of the C-PSCell(s) and the C-SN configuration(s). In accordance with the cell ID(s) of the C-PSCell(s), the MN 104 can know which candidate cell(s) in the candidate cell information 310 has been accepted or configured by the C-SN 106A as the C-PSCell(s).

In some implementations, the MN 104 can obtain cell ID(s) of the C-PSCell(s) in the C-SN configuration(s) instead of using the cell ID(s) outside the C-SN configuration(s), which requires the MN 104 to implement an ASN. 1 decoder for decoding the C-SN configuration(s). In such cases, the C-SN 106A might or might not include the cell ID(s) of the C-PSCell(s) in the SN Addition Request Acknowledge message. Such implementations use additional processing time and memory of the MN 104 to store the ASN. 1 decoder and decode the C-SN configuration(s).

If the MN 104 receives an S-SN configuration in the SN Change Required message from the S-SN 106B, the MN 104 can include the S-SN configuration in the SN Addition Request message. The C-SN 106A can generate the C-SN configuration(s) as delta configuration(s) on top of the S-SN configuration (i.e., each of the C-SN configuration(s) includes configuration parameter(s) augmenting the S-SN configuration). Alternatively, if the C-SN 106A does not support generating delta configuration(s), the C-SN 106A can generate the C-SN configuration(s) as full configuration(s) irrespective of the S-SN configuration (i.e., each of the C-SN configuration(s) is a complete and self-contained configuration). Otherwise, the MN 104 does not include an S-SN configuration in the SN Addition Request message. In such cases, the C-SN 106A generates the C-SN configuration(s) as full configuration(s).

In some implementations, the MN 104 can include a conditional configuration indication in the SN Addition Request message to indicate to the C-SN 106A to determine C-PSCell(s) and/or generate the C-SN configuration(s) for each of the determined C-PSCell(s). In accordance with the conditional configuration indication, the C-SN 106A can determine that the SN Addition Request message is for a conditional SN addition or change instead of an immediate SN addition or change. In other implementations, if the MN 104 uses a conditional configuration specific IE to include the candidate cell information, the C-SN 106A can determine that the SN Addition Request message is for a conditional SN addition or change instead of an immediate SN addition or change in accordance with the IE. In such cases, the MN 104 might or might not include an explicit conditional configuration indication in the SN Addition Request message.

In some implementations, the C-SN 106A can include a conditional configuration indication in the SN Addition Request Acknowledge message to indicate the C-SN configuration(s). In other implementations, the C-SN 106A uses a conditional configuration specific IE to include the C-SN configuration(s). In such cases, the C-SN 106A might or might not include an explicit conditional configuration indication in the SN Addition Request Acknowledge message.

In some implementations, the C-SN 106A can generate a first list IE to include ID(s) of the C-PSCell(s) and a second list IE to include the C-SN configuration(s). There is an association between a particular entry of the first list and a particular entity of the second list. For example, the first entry (e.g., cell ID(s) of cell 125A) of the first list is associated with the first entry (e.g., C-SN configuration 1) of the second list, the second entry (e.g., cell ID(s) of cell 126A) of the first list is associated with the second entry (e.g., C-SN configuration 2) of the second list, the third entry (e.g., cell ID(s) of cell 127A) of the first list is associated with the first entry (e.g., C-SN configuration 3) of the second list, and so on.

In other implementations, the C-SN 106A can generate a list of entries where each includes cell ID(s) of a particular C-PSCell in the determined C-PSCell(s) and the corresponding C-SN configuration. In some implementations, the C-SN 106A can include the list in an RRC Container IE (e.g., a CG-Config 1E). In other implementations, for each determined C-PSCell, the C-SN 106A can include the corresponding C-SN configuration in a particular RRC Container IE (e.g., a CG-Config 1E) and generate a list of entries where each includes cell ID(s) of a particular C-PSCell in the determined C-PSCell(s) and the corresponding RRC Container IE.

In some implementations, the cell ID(s) includes a cell global ID (CGI) and/or a physical cell identity (PCI). The MN 104 or S-SN 106B may maintain a table for mapping between the CGI and the physical cell ID (PCI, e.g., as specified in 3GPP TS 36.423 or 38.423) or another suitable identifier of a particular cell in the wireless communication system 100 for the purpose of management of conditional configurations.

After receiving 322 the SN Addition Request Acknowledge message, the MN 104 (generates or assigns configuration ID(s), if needed, and) associates 324 the configuration ID(s) with the C-PSCell(s) (e.g., the cell ID(s) of each of the C-PSCell(s)) and/or the C-SN configuration(s) when preparing an RRC reconfiguration (e.g., RRCReconfiguration or RRCConnectionReconfiguration) message. Table 2 is an example of the association between configuration ID(s), cell ID(s), condition(s), and C-SN configuration(s). Later on, the MN 104 can use the association to manage (e.g., modify or release) a particular C-SN configuration that the MN 104 sends to the UE 102 at event 326 or 327, as described for FIGS. 3B-3F.

TABLE 2

Example of the association between configuration ID(s), cell ID(s), condition(s) and C-SN configuration(s)

| Configuration ID(s) (determined and generated by the MN 104) | Cell ID(s) of C-PSCell(s) (determined by the C-SN 106A and received in the SN Addition Request Acknowledge | Condition(s) | C-SN configuration(s) in the SN Addition Request Acknowledge |
|---|---|---|---|
| 0 | Cell ID(s) of Cell 125A | Condition 1 | C-SN configuration 1 |
| 1 | Cell ID(s) of Cell 126A | Condition 2 | C-SN configuration 2 |
| 2 | Cell ID(s) of Cell 127A | Condition 3 | C-SN configuration 3 |

The MN 104 generates a conditional configuration addition or modification list (e.g., CondReconfigToAddModList IE) where each entry includes a particular configuration ID, a particular condition, and a particular C-SN configuration for a particular C-PSCell. The MN 104 sends 326 the RRC reconfiguration message to the UE 102. In some implementations, the particular condition can be defined as an OCTET STRING as described above, so that the condition is transparent to the MN 104 and the MN 104 does not need to decode the condition and directly include the particular condition received from the S-SN 106B in the conditional configuration addition or modification list. The UE 102 applies the configuration and sends 328, to the MN 104, an RRC reconfiguration complete (e.g., RRCReconfigurationComplete or RRCConnectionReconfigurationComplete) message. The MN 104 sends 330, to the S-SN 106B, an SN Change Confirm message, which may include C-PSCell information indicating the C-PSCell(s) where the C-SN 106A generated the corresponding C-SN configuration(s). The events 310, 316, 318, 320, 322, 324, 326, 328, and 330 can collectively be referred to as an SN-initiated Conditional SN Change preparation event 380. The S-SN 106B may, in response to the SN Change Confirm message or a User-Plane Address Indication (e.g., Xn Address Indication) message, send 332 an Early Status Transfer message for the purpose of early data forwarding. The MN 104 forwards 334 the Early Status Transfer message to the C-SN 106A.

The UE 102 may detect 336 a condition for connecting to a C-PSCell is met and initiate a random access procedure on the C-PSCell in response to the detection. The UE 102 performs 338 the random access procedure with the C-SN 106A via the C-PSCell. The UE 102 sends 340, to the MN 104, an RRC reconfiguration complete (e.g., RRCReconfigurationComplete or RRCConnectionReconfiguration-Complete) message including the C-SN configuration complete (e.g., RRCReconfiguration Complete or RRCConnectionReconfigurationComplete) message corresponding to the C-PSCell. Depending on the implementation, the UE 102 may transmit 340 the RRC reconfiguration complete message before or after performing 338 the random access procedure with the C-SN 106A. After or in response to receiving 340 the RRC reconfiguration complete message or the C-SN configuration complete message, the MN 104 sends 342, to the C-SN 106A, an SN Reconfiguration Complete (e.g., SGNB RECONFIGURATION COMPLETE, S-NODE RECONFIGURATION COMPLETE) message including the C-SN configuration complete message. After or in response to receiving 340 the RRC reconfiguration complete message or the C-SN configuration complete message, the MN 104 also sends 344, to the S-SN 106B, a Conditional SN Change Success message to indicate the success of the SN-initiated SN change procedure. The S-SN 106B in response may send 348, to the MN 104, an SN Status Transfer message and the MN 104 sends 348, to the C-SN 106A the SN Status Transfer message if the concerned radio bearers are configured with RLC AM. The MN 104 sends 349, to the S-SN 106B, a UE Context Release message. The events 340, 342, 344, 346, 348, and 349 can collectively be referred to as an SN-initiated Conditional SN Change execution event 390. The UE 102 communicates 350 with the C-SN 106A via the C-PSCell in accordance with the C-SN configuration.

In some alternative implementations, the UE 102 sends 340 to the MN 104 a UL Information Transfer message (e.g., ULInformationTransfer) message including the C-SN configuration complete message) instead of the RRC reconfiguration complete message. In such cases, the MN 104 can send 342 to the C-SN 106A an RRC Transfer message including the C-SN configuration complete message instead of the SN Reconfiguration Complete message. The description relating to the RRC reconfiguration message at event 340 can apply to the UL Information Transfer message.

In some implementations, the MN 104 provides the C-PSCell information in an SN Modification Request message to the S-SN 106B after receiving the SN Addition Request Acknowledge message at event 322 instead of including the C-PSCell information in the SN Change Confirm message. In response, the S-SN 106B may send an SN Modification Request Acknowledge message including an updated S-SN configuration. The MN 104 may send the updated S-SN configuration along with the conditional configuration(s) in the RRC reconfiguration message at event 326 or in a second RRC reconfiguration message after event 326 or 328.

In some implementations, the MN 104 may determine to initiate an MN-initiated conditional SN addition or change procedure for the UE 102, similar to the SN-initiated conditional SN change 380 except that the MN 104, in such cases, does not receive an SN Change Required message (e.g., the SN Change Required message 310) and transmit an SN Change Confirm message. In such cases, the MN 104 can generate candidate cell information and include the candidate cell information in an SN Addition Request message of the MN-initiated conditional SN addition or change procedure, similar to event 318. In some implementations, the MN 104 can generate condition(s) and includes the condition(s) in the conditional configuration as an OCTET STRING in a field of the SN Addition Request message. In other implementations, the MN 104 can generate condition (s) and includes the condition(s) in an IE of the SN Addition Request message.

Figure 3B:
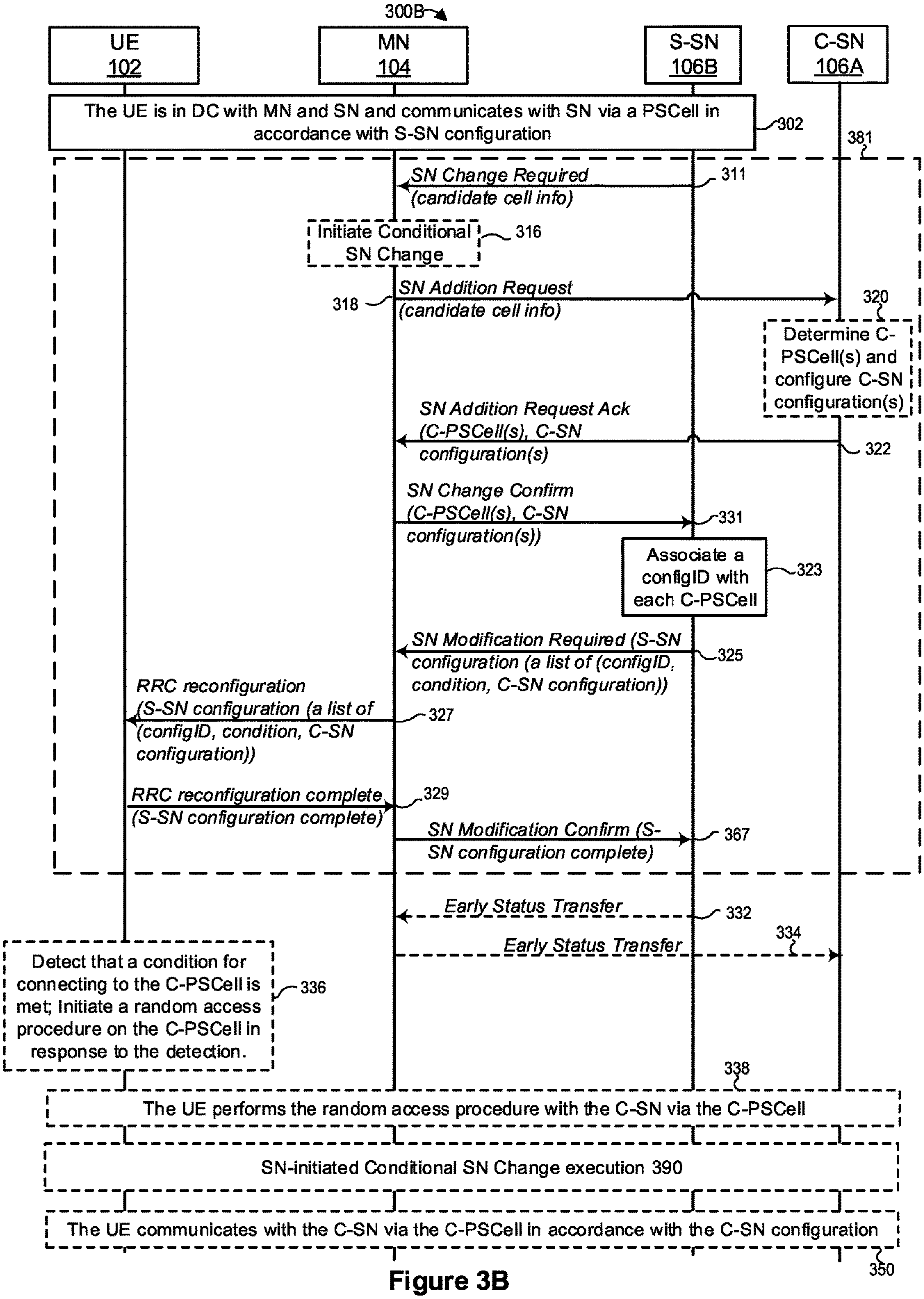
FIG. 3B is a messaging diagram of an example scenario similar to the scenario of FIG. 3A, but where the SN assigns a configuration ID to each of the C-PSCells and transmits the configuration IDs, conditions, and conditional configurations to the UE via the MN.

Next referring to FIG. 3B, a scenario 300B is similar to the scenario 300A, except that the S-SN 106B, rather than the MN 104, associates the configuration ID(s) with the C-PSCell(s)

In the scenario 300B, the S-SN 106B sends 311, to the MN 104, an SN Change Required message (e.g., SGNB CHANGE REQUIRED or S-NODE CHANGE REQUIRED) message including a C-SN ID (e.g., Global NG-RAN Node ID or Global en-gNB ID) and candidate cell information indicating the potential C-PSCell(s). In some implementations, the C-SN ID can be renamed as a target SN ID. In response to the SN Change Required message, the MN 104 may initiate 316 a conditional SN change procedure as instructed by the S-SN 106B. The MN 104 sends 318, to the C-SN 106A, an SN Addition Request (e.g., SGNB ADDITION REQUEST or S-NODE ADDITION REQUEST) message including the candidate cell information. The C-SN 106A determines 320C-PSCell(s) from the potential C-PSCell(s) in the candidate cell information, configures a particular C-SN configuration corresponding to each determined C-PSCell, and sends 322, to the MN 104, an SN Addition Request Acknowledge message including cell ID(s) of the C-PSCell(s) and the C-SN configuration(s). In accordance with the cell ID(s) of the C-PSCell(s), the MN 104 can determine which candidate cell(s) in the candidate cell information 311 has been accepted or configured by the C-SN 106A as the C-PSCell(s).

After receiving 322 the SN Addition Request Acknowledge message, the MN 104 sends 331, to the S-SN 106B, an SN Change Confirm message, which may include the C-PSCell information indicating the C-PSCell(s) for which the C-SN 106A generated corresponding C-SN configuration(s). Similar to scenario 300A, the association between a particular condition and a particular potential C-PSCell can be found in the Table 1 and an example of the association between configuration ID(s), cell ID(s), condition(s) and C-SN configuration(s) can be found in Table 2, respectively. The S-SN 106B (generates or assigns configuration ID(s) and) associates 323 the configuration ID(s) with the C-PSCell(s) (e.g., the cell ID(s) of each of the C-PSCell(s)), the condition(s), and the C-SN configuration(s) when preparing an RRC reconfiguration (e.g., RRCReconfiguration or RRC-ConnectionReconfiguration) message for an S-SN configuration. The S-SN 106B may send 325, to the MN 104, an SN Modification Required (e.g., SGNB MODIFICATION REQUIRED or S-NODE MODIFICATION REQUIRED) message including the S-SN configuration, which includes the S-SN generated conditional configuration addition or modification list (e.g., CondReconfigToAddModList IE), where each entry includes a particular configuration ID, a particular condition, and a particular C-SN configuration for a particular C-PSCell. The MN 104 sends 327, to the UE 102, an RRC reconfiguration message including the S-SN configuration received at event 325. The UE 102 applies the configuration and sends 329, to the MN 104, an RRC reconfiguration complete (e.g., RRCReconfigurationComplete or RRCConnectionReconfiguration Complete) message including an S-SN configuration complete message (e.g., RRCReconfigurationComplete or RRCConnectionReconfigurationComplete). The MN 104 sends 367, to the S-SN 106B, an SN Modification Confirm message, which includes the S-SN configuration complete message. The events 311, 316, 318, 320, 322, 323, 331, 325, 327, 329, and 367 can collectively be referred to as an SN-initiated Conditional SN Change preparation event 381.

The UE 102 may detect 336 a condition for connecting to the C-PSCell is met and initiates a random access procedure on the C-PSCell in response to the detection. The UE 102 then performs 338 the random access procedure with the C-SN via the C-PSCell. The UE 102, the MN 104, the S-SN 106B, and the C-SN 106A may perform 390 the SN-initiated Conditional SN Change execution procedure. The UE 102 then communicates 350 with the C-SN 106A via the C-PSCell in accordance with the C-SN configuration.

Figure 3C:
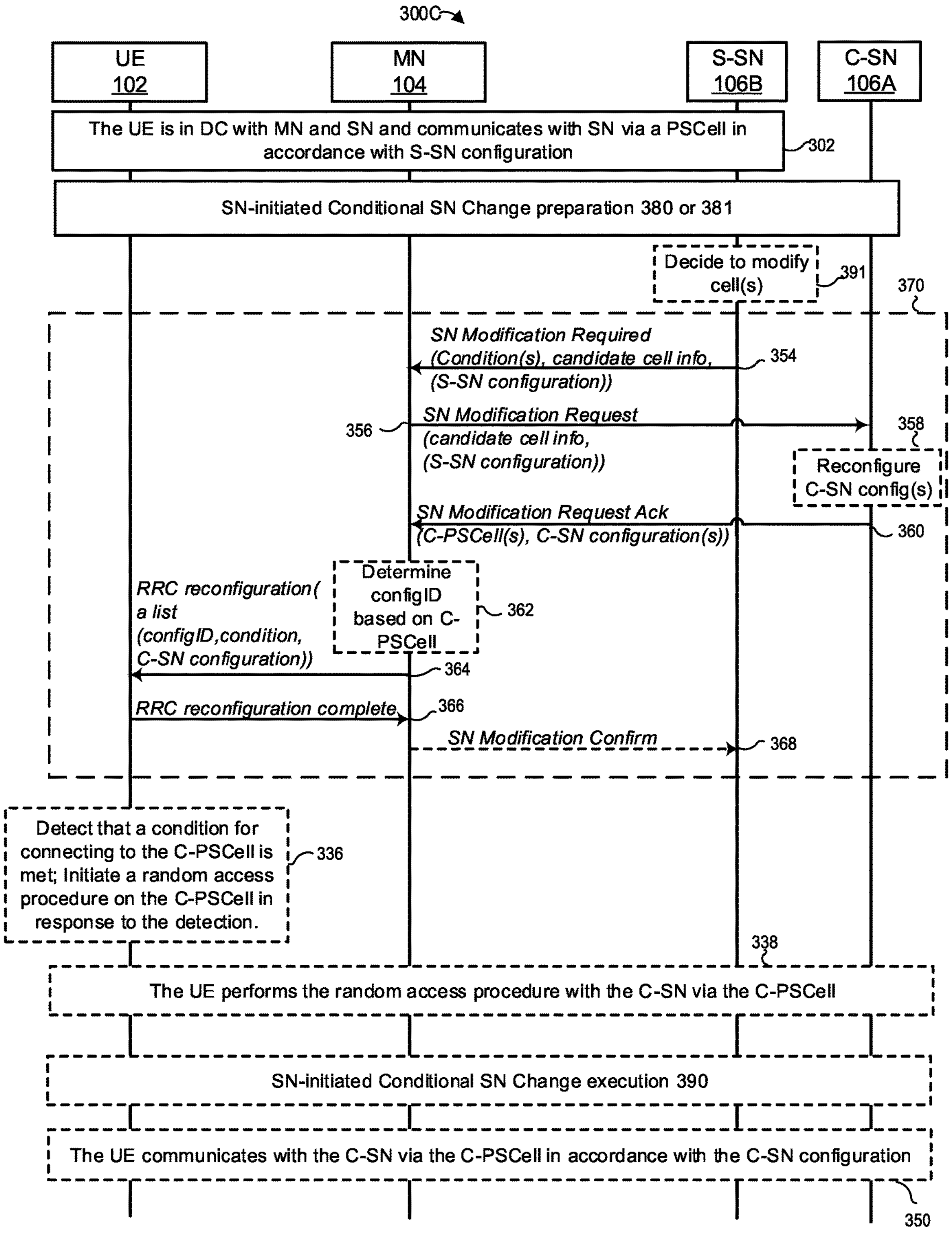
FIG. 3C is a messaging diagram of an example scenario similar to the scenario of FIG. 3A or FIG. 3B, in which the S-SN triggers the MN to request modifications to the prepared conditional configurations.

Now referring to FIG. 3C, a scenario 300C may be similar to the scenario 300A or the scenario 300B, but also includes a modification to the prepared conditional SN change triggered by the S-SN 106B. In the scenario 300C, the UE 102, MN 104, S-SN 106B, and the C-SN 106A perform the SN-initiated Conditional SN Change preparation procedure as specified in event 380 or 381. At a later time, the S-SN 106B may decide 391 to modify one or more cell(s) due to, for example, receiving one or more updated measurement results from the UE 102. The S-SN 106B sends 354, to the MN 104, an SN Modification Required (e.g., SGNB MODIFICATION REQUIRED or S-NODE MODIFICATION REQUIRED) message, which may include the (updated) condition(s), associated candidate cell information and/or a C-SN ID (e.g., Global NG-RAN Node ID or Global en-gNB ID). In some implementations, the C-SN ID can be renamed as a target SN ID. The MN 104 in response sends 356, to the C-SN 106A, an SN Modification Request (e.g., SGNB MODIFICATION REQUEST or S-NODE MODIFICATION REQUEST) message including candidate cell information provided by the S-SN 106B.

In some implementations, the S-SN 106B determines to transmit 354 an SN Modification Required message in response to an SN-initiated SN modification or an MN-initiated SN modification. In such cases, the S-SN 106B includes an S-SN configuration (i.e., an S-SN configuration updated during the MN- or SN-initiated SN modification) in the SN Modification Required message, and the MN 104 includes the S-SN configuration in the SN Modification Request that the MN 104 transmits 356 to the C-SN 106A. The C-SN 106A can utilize the S-SN configuration to generate delta C-SN configurations. Such a scenario is described with reference to FIG. 3F.

In some implementations (not shown), the S-SN 106B at event 391 determines to modify one or more of the conditions, and does not modify the cell(s). In such implementations, the MN 104 can refrain from transmitting 356 the SN Modification Request, and can proceed directly to event 364 after receiving 354 the updated condition(s) from the S-SN 106B.

In response to receiving 356 the SN Modification Request, the C-SN 106A reconfigures 358 the corresponding C-SN configurations. The C-SN 106A sends 360, to the MN 104, an SN Modification Request Acknowledge (e.g., SGNB MODIFICATION REQUEST ACKNOWLEDGE or S-NODE MODIFICATION REQUEST ACKNOWLEDGE) message including the cell ID(s) of C-PSCell(s) and the C-SN configuration(s). In accordance with the cell ID(s) of the C-PSCell(s), the MN 104 can determine which candidate cell(s) has been modified by the C-SN 106A. In some implementations, the MN 104 can obtain cell ID(s) of the C-PSCell(s) in the C-SN configuration(s) instead of using the cell ID(s) outside the C-SN configuration(s), which requires the MN 104 to implement an ASN. 1 decoder for decoding the C-SN configuration(s). In such cases, the C-SN 106A might or might not include the cell ID(s) of the C-PSCell(s) in the SN Modification Required message. Such implementations use additional processing time and memory of the MN 104 to store the ASN. 1 decoder and decode the C-SN configuration(s).

In some implementations, the S-SN 106B includes a conditional configuration indication in the SN Modification Required message to indicate the C-SN configuration(s). In other implementations, the S-SN 106B uses a conditional configuration specific IE to include the C-SN configuration(s). In such cases, the S-SN 106B might or might not include an explicit conditional configuration indication in the SN Modification Required message.

In some implementations, the MN 104 can include a conditional configuration indication in the SN Modification Request message to indicate to the C-SN 106A to determine C-PSCell(s) and/or generate the C-SN configuration(s) for each of the determined C-PSCell(s). In accordance with the conditional configuration indication, the C-SN 106A can determine that the SN Modification Request message is for a conditional SN addition or change instead of an immediate SN addition or change. In other implementations, if the MN 104 uses a conditional configuration specific IE to include the candidate cell information, the C-SN 106A can determine the SN Modification Request message is for a conditional SN addition or change instead of an immediate SN addition or change in accordance with the IE. In such cases, the MN 104 might or might not include an explicit conditional configuration indication in the SN Modification Request message.

In some implementations, the C-SN 106A can include a conditional configuration indication in the SN Modification Request Acknowledge message to indicate the C-SN configuration(s). In other implementations, the C-SN 106A uses a conditional configuration specific IE to include the C-SN configuration(s). In such cases, the C-SN 106A might or might not include an explicit conditional configuration indication in the SN Modification Request Acknowledge message. Further, similar to event 322, in some implementations, the C-SN 106A generates a first list IE to include the C-PSCell(s) and a second list IE to include the C-SN configuration(s). In other implementations, the C-SN 106A generates a list of entries where each includes cell ID(s) of a particular C-PSCell in the determined C-PSCell(s) and the corresponding C-SN configuration.

After receiving 360 the SN Modification Request Acknowledge message, the MN 104 determines 362 configuration ID(s) based on the cell ID(s) of each of the C-PSCell(s) when preparing an RRC reconfiguration (e.g., RRCReconfiguration or RRCConnectionReconfiguration) message for the updated C-SN configuration(s). A similar example method as described in scenario 300A can be applied here for determining the particular configuration ID(s) (e.g., the MN 104 can use the associations determined at event 324 to determine 362 the configuration ID(s)). The MN 104 generates a conditional configuration addition or modification list (e.g., CondReconfigToAddModList IE), where each entry includes a particular configuration ID, a particular condition, and a particular C-SN configuration for a particular C-PSCell. The MN 104 sends 364 the RRC reconfiguration message including the conditional configuration addition or modification list to the UE 102. The UE 102 applies the configuration and sends 366, to the MN 104, an RRC reconfiguration complete message. The MN 104 sends 368, to the S-SN 106B, an SN Modification Confirm message, which may include a conditional configuration indication and/or the cell information accepted/chosen by the C-SN 106A. The events 354, 356, 358, 360, 362, 364, 366, 368 can be collectively be referred to as an SN-initiated SN modification on Conditional SN Change preparation event 370.

Figure 3D:
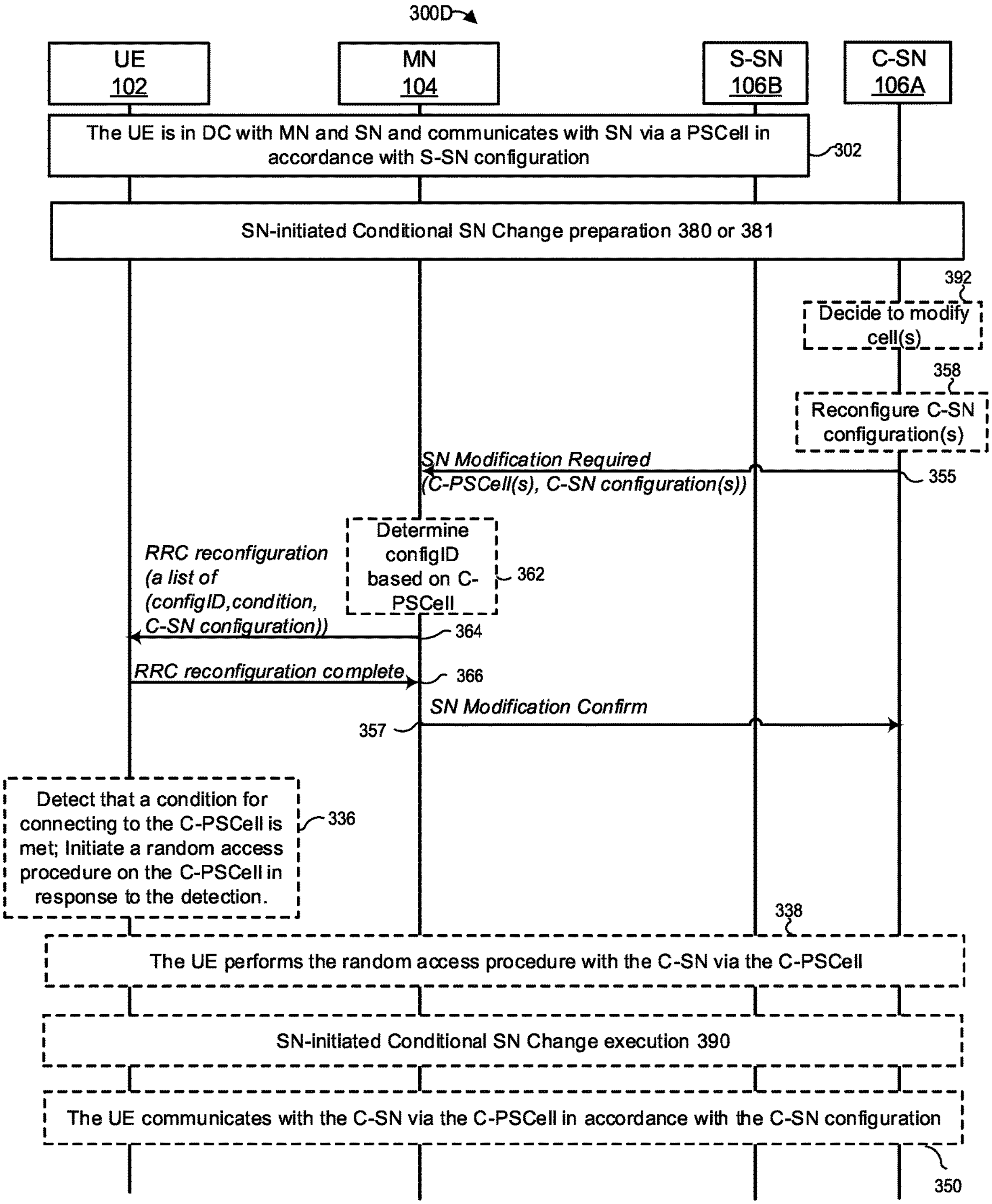
FIG. 3D is a messaging diagram of an example scenario similar to the scenario of FIG. 3A or FIG. 3B, in which the C-SN modifies the prepared conditional configuration.

Next referring to FIG. 3D, a scenario 300D is similar to the scenario 300C, but where the C-SN 106A initiates the modification to the prepared conditional SN change. The modification may include replacing and cancelling of prepared C-PSCells in the C-SN 106A. In the scenario 300D, the UE 102, MN 104, S-SN 106B, and the C-SN 106A perform the SN-initiated Conditional SN Change preparation procedure as specified in event 380 or 381. At a later time, the C-SN 106A may decide 392 to modify some cell(s) due to, for example, an updated loading condition on the prepared C-PSCell(s). In response, the C-SN 106A reconfigures 358 the corresponding C-SN configuration(s). The condition(s) for connecting to the C-PSCell(s), generated by the S-SN 106B, can remain unchanged. The C-SN 106A sends 355, to the MN 104, an SN Modification Required (e.g., SGNB MODIFICATION REQUIRED or S-NODE MODIFICATION REQUIRED) message, which may include the (updated) cell ID(s) of the C-PSCell(s) and the associated (updated)C-SN configuration(s) and/or the cell ID(s) of the C-PSCell(s) to be cancelled or released.

In some implementations, the C-SN 106A can include a conditional configuration indication in the SN Modification Required message to indicate the C-SN configuration(s). In other implementations, the C-SN 106A uses a conditional configuration specific IE to include the C-SN configuration(s). In such cases, the C-SN 106A might or might not include an explicit conditional configuration indication in the SN Modification Required message.

Similar to event 322, In some implementations, the C-SN 106A can generate a first list IE to include the C-PSCell(s) and a second list IE to include the C-SN configuration(s). In other implementations, the C-SN 106A can generate a list of entries where each includes cell ID(s) of a particular C-PSCell in the determined C-PSCell(s) and the corresponding C-SN configuration.

After receiving 355 the SN Modification Required message, the MN 104 determines 362 configuration ID(s) based on the cell ID(s) of each of the C-PSCell(s) when preparing an RRC reconfiguration (e.g., RRCReconfiguration or RRCConnectionReconfiguration) message for the updated C-SN configuration(s). The MN 104 generates a conditional configuration addition or modification list (e.g., CondReconfigToAddModList IE), where each entry includes a particular configuration ID, a particular condition, and a particular (updated)C-SN configuration for a particular C-PSCell. The MN 104, corresponding to the cell ID(s) of the C-PSCell to be cancelled or released, generates a conditional configuration release list (e.g., CondReconfigToRemoveList IE), where each entry includes a particular configuration ID for a particular C-PSCell. The MN 104 sends 364 the RRC reconfiguration message including the conditional configuration addition or modification list and/or the conditional configuration release list to the UE 102. The UE 102 applies the configuration and sends 366, to the MN 104, an RRC reconfiguration complete message. The MN 104 sends 368, to the C-SN 106A, an SN Modification Confirm message, which may include a conditional configuration indication and/or the cell information accepted/chosen by the C-SN 106A.

Figure 3E:
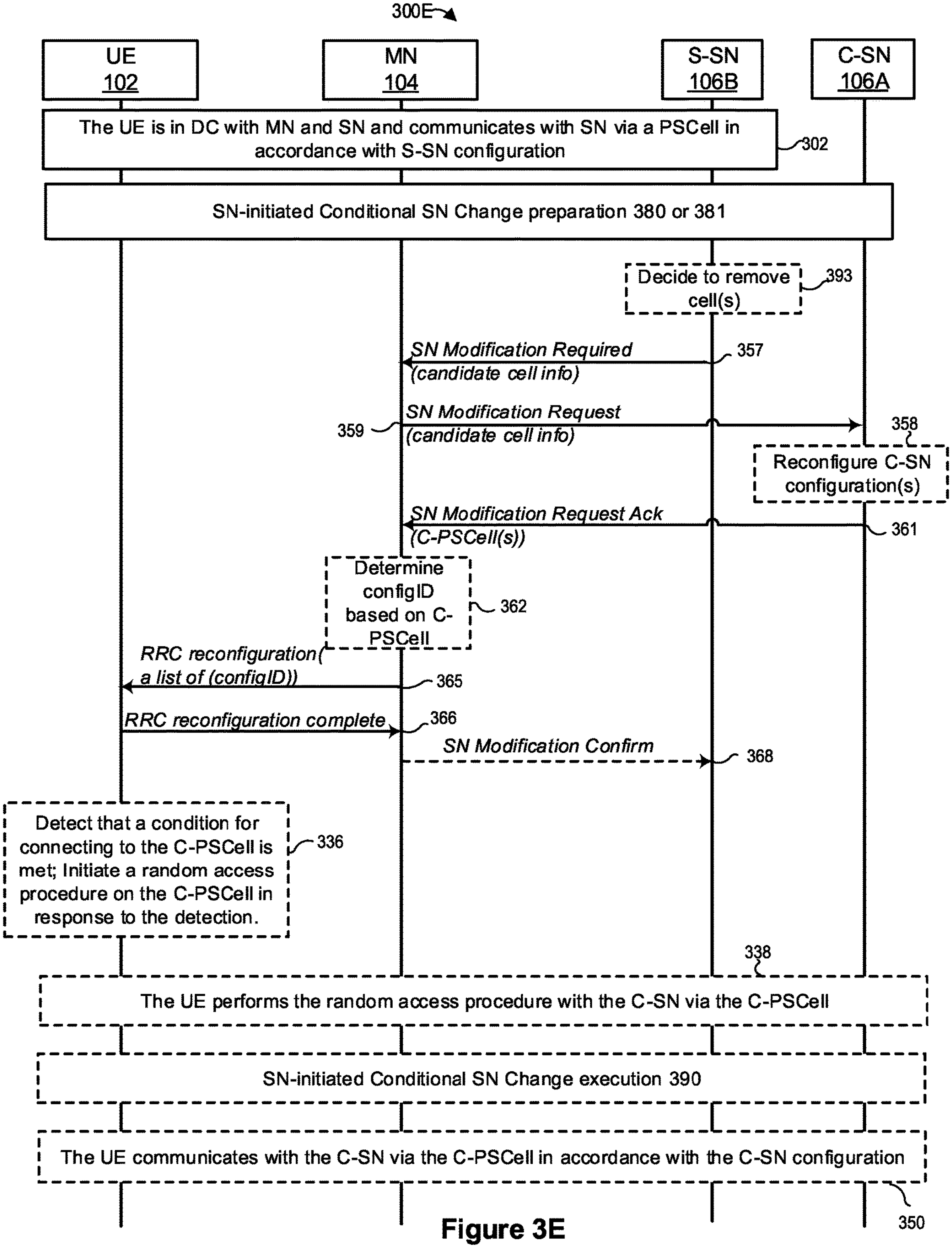
FIG. 3E is a messaging diagram of an example scenario similar to the scenario of FIG. 3A or FIG. 3B, in which the S-SN triggers the MN to remove one or more of the prepared conditional configurations.

Next referring to FIG. 3E, a scenario 300E is similar to the scenario 300C, but where the S-SN 106B determines to remove one or more cell(s) and the associated C-SN configuration(s). In the scenario 300E, the UE 102, MN 104, S-SN 106B, and the C-SN 106A perform the SN-initiated Conditional SN Change preparation procedure as specified in event 380 or 381. At a later time, the S-SN 106B may decide 393 to remove one or more C-PSCells due to, for example, receiving one or more updated measurement results from the UE 102. The S-SN 106B receives cell ID(s) of the C-PSCell(s) from the C-SN-106A during the procedure 380 or 381. The S-SN 106B sends 357, to the MN 104, an SN Modification Required (e.g., SGNB MODIFICATION REQUIRED or S-NODE MODIFICATION REQUIRED) message, which may include candidate cell information (e.g., cell ID(s) of the one or more C-PSCells) indicating the C-PSCell(s) to be removed and/or a C-SN ID. For example, S-SN 106B can include, in an IE (e.g., release IE) in the SN Modification Required message, cell ID(s) of the one or more C-PSCells to indicate removing the one or more cells. The MN 104 in response sends 359, to the C-SN 106A, an SN Modification Request (e.g., SGNB MODIFICATION REQUEST or S-NODE MODIFICATION REQUEST) message including the candidate cell information provided by the S-SN 106B. In some implementations, the MN 104 can transparently include the candidate cell information in the SN Modification Request message without decoding the candidate cell information. The C-SN 106A in response may reconfigure 358 the corresponding C-SN configuration(s) by removing the C-SN configuration(s). The C-SN 106A sends 361, to the MN 104, an SN Modification Request Acknowledge (e.g., SGNB MODIFICATION REQUEST ACKNOWLEDGE or S-NODE MODIFICATION REQUEST ACKNOWLEDGE) message including the cell ID(s) of C-PSCell(s) to be removed. In accordance with the cell ID(s) of the C-PSCell(s), the MN 104 can know which candidate cell(s) has been removed by the C-SN 106A. In some implementations, the MN 104 can decode the candidate cell information received at event 357 to obtain cell ID(s) of the C-PSCell(s), which requires the MN 104 to implement an ASN.1 decoder for decoding the candidate cell information that MN 104 received at event 357. In accordance with the cell ID(s) of the C-PSCell(s), the MN 104 can know which candidate cell(s) to be removed. The MN 104 then includes the cell ID(s) of the C-PSCell(s) in candidate cell information in the SN Modification Request message. In such cases, the C-SN 106A might or might not include the cell ID(s) of the C-PSCell(s) in the SN Modification Request Acknowledge message.

After receiving 361 the SN Modification Request Acknowledge message, the MN 104 determines 362 configuration ID(s) based on the cell ID(s) of each of the C-PSCell(s) when preparing an RRC reconfiguration (e.g., RRCReconfiguration or RRCConnectionReconfiguration) message. The MN 104 generates a conditional configuration release list (e.g., CondReconfigToRemoveList IE) where each entry includes a particular configuration ID, corresponding to the C-PSCell to be removed. The MN 104 sends 365, to the UE 102, the RRC reconfiguration message including the conditional configuration release list. The UE 102 applies the configuration and sends 366, to the MN 104, an RRC reconfiguration complete message. The MN 104 may send 368, to the S-SN 106B, an SN Modification Confirm message, which may include a conditional configuration indication.

Figure 3F:
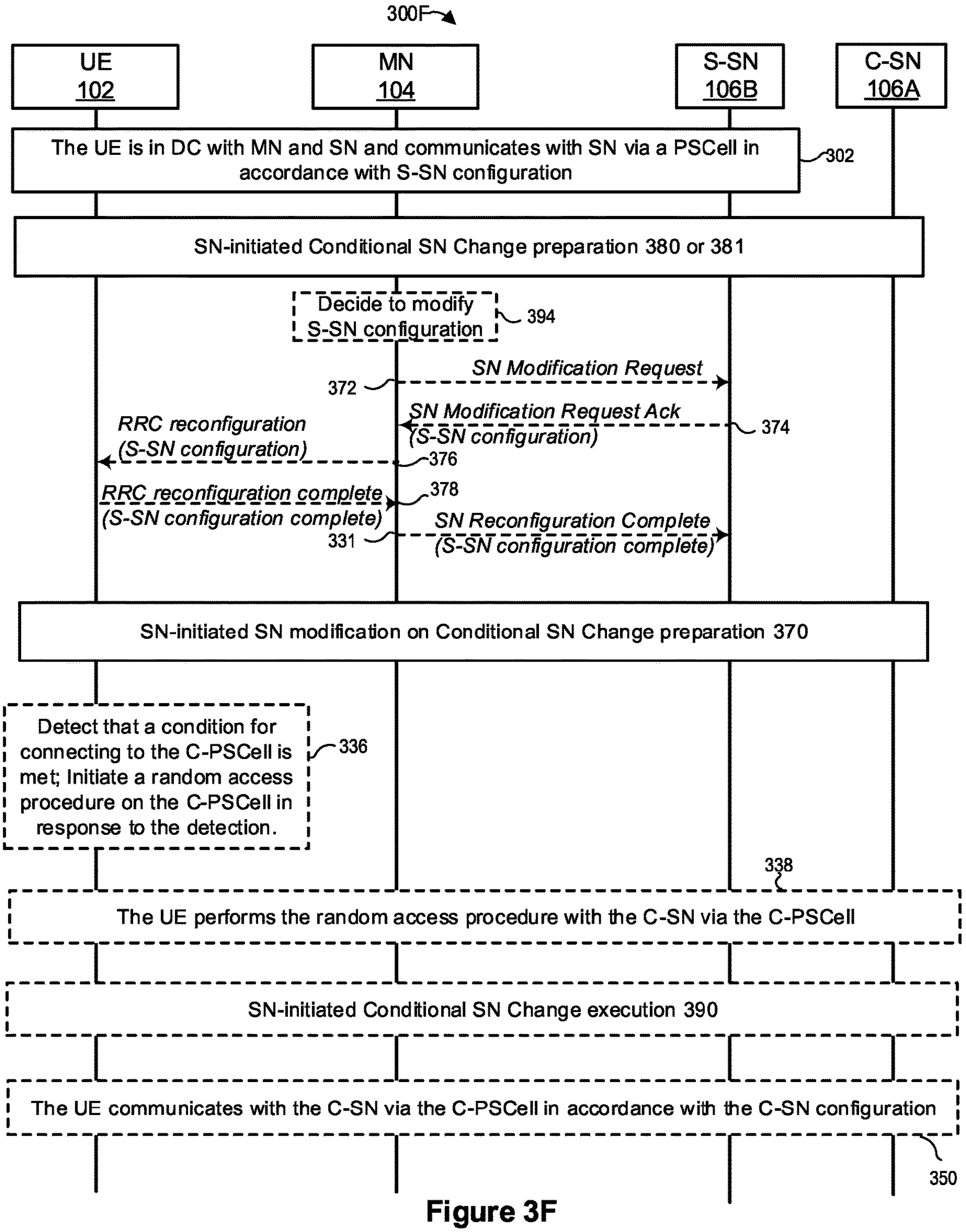
FIG. 3F is a messaging diagram of an example scenario similar to the scenario of FIG. 3A or FIG. 3B in which the MN determines to modify the prepared conditional configuration.

Next referring to FIG. 3F, a scenario 300F may be similar to the scenario 300A or the scenario 300B, but also includes an MN-initiated modification to the prepared conditional SN change. In the scenario 300F, the UE 102, MN 104, S-SN 106B, and the C-SN 106A perform the SN-initiated Conditional SN Change preparation procedure as specified in event 380 or 381. At a later time, the MN 104 may decide

394 to modify the S-SN configuration, for example, due to updated radio bearer configurations (e.g., added or released radio bearers). The MN 104 sends 372, to the S-SN 106B, an SN Modification Request (e.g., SGNB MODIFICATION REQUEST or S-NODE MODIFICATION REQUEST) message including the updated information in an RRC Container (e.g. a CG-ConfigInfo IE). The S-SN 106B in response may reconfigure the corresponding S-SN configuration. The S-SN 106B sends 374, to the MN 104, an SN Modification Request Acknowledge (e.g., SGNB MODIFICATION REQUEST ACKNOWLEDGE or S-NODE MODIFICATION REQUEST ACKNOWLEDGE) message including the updated S-SN configuration. The MN 104 may then send 376, to the UE 102, an RRC reconfiguration message including the updated S-SN configuration. The UE 102 applies the configuration and sends 378, to the MN 104, an RRC reconfiguration complete message including an S-SN configuration complete message. The MN 104 sends 331, to the S-SN 106B, an SN Reconfiguration Complete message including the S-SN configuration complete message. Following the MN-initiated SN modification, the UE 102, the MN 104, the S-SN 106B, and the C-SN 106A then perform an SN-initiated SN modification on Conditional SN Change preparation procedure as specified in event 370 of FIG. 3C.

Figure 3G:
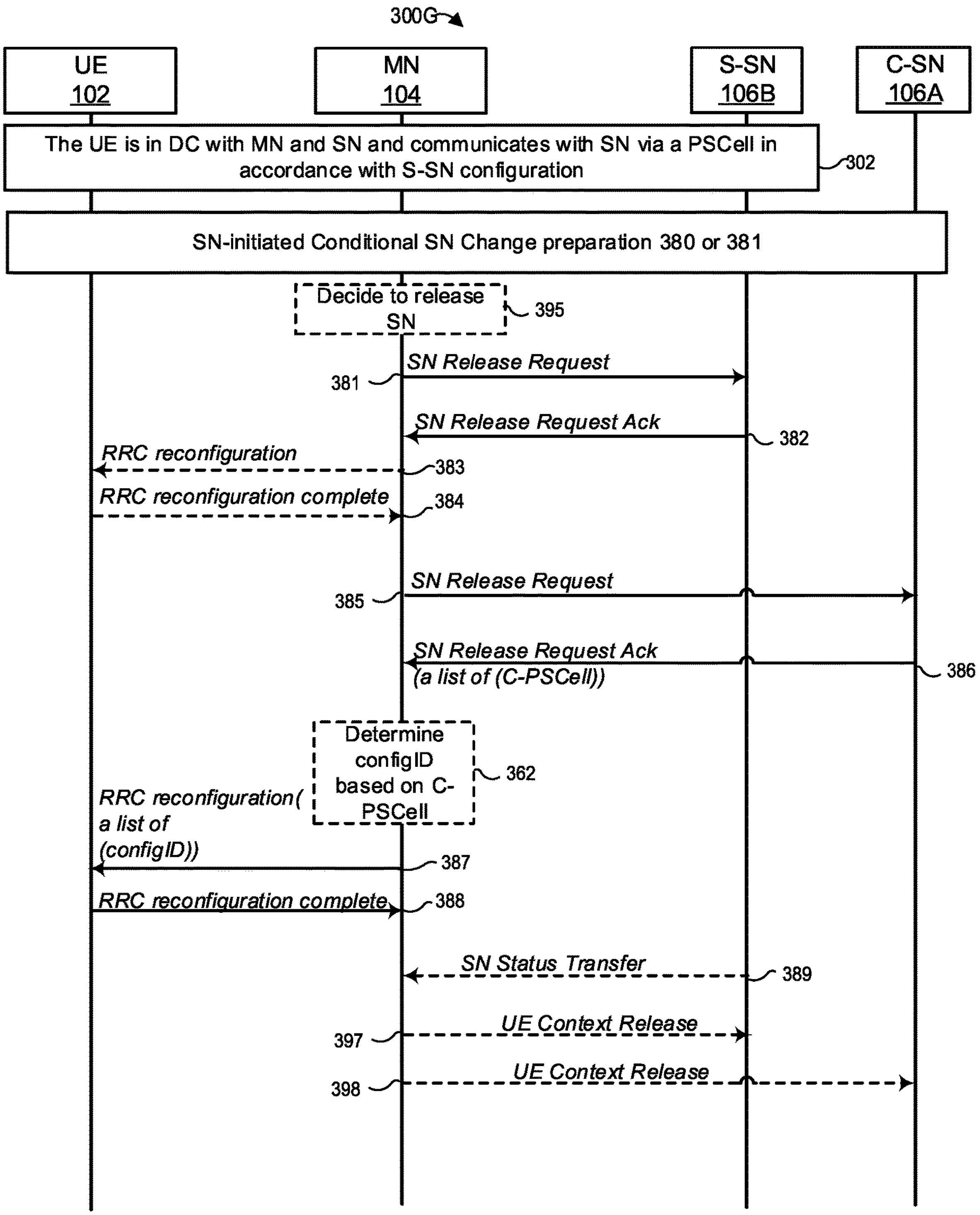
FIG. 3G is a messaging diagram of an example scenario similar to the scenario of FIG. 3A or FIG. 3B, in which the MN releases the S-SN, and, in response, also releases the C-SN.

Next referring to FIG. 3G, a scenario 300G may be similar to the scenario 300A or the scenario 300B, but includes releasing the source SN and therefore the prepared SN-initiated conditional SN change. In the scenario 300G, the UE 102, MN 104, S-SN 106B, and the C-SN 106A perform the SN-initiated Conditional SN Change preparation procedure as specified in event 380 or 381. The MN 104 later in time may decide 395 to release the S-SN 106B. In some implementations, the MN 104 makes the decision 395 due to a low power indication, DC release indication or overheating indication received from the UE 102. In another implementation, the MN 104 makes the decision 395 due to one or more measurement results are below a threshold configured by the MN 104 or above a pre-determined or preconfigured threshold. The MN 104 can receive the measurement result(s) from the UE 102 or the S-SN 106B. In yet another implementation, the MN 104 makes the decision 395 due to a SN Release Required message received from the S-SN 106B. The MN 104 sends 381, to the S-SN 106B, an SN Release Request (e.g., SGNB RELEASE REQUEST or S-NODE RELEASE REQUEST) message. In response, the S-SN 106B sends 382, to the MN 104, an SN Release Request Acknowledge (e.g., SGNB RELEASE REQUEST ACKNOWLEDGE or S-NODE RELEASE REQUEST ACKNOWLEDGE) message. The MN 104 may send 383, to the UE 102, an RRC reconfiguration message instructing the UE 102 to release the S-SN configuration. The UE 102 can then release the S-SN configuration and then send 384, to the MN 104, an RRC reconfiguration complete message.

In response to deciding 395 to release the S-SN 106B, the MN 104 also releases the C-SN 106A. The MN-104 sends 385, to the C-SN 106A, an SN Release Request (e.g., SGNB RELEASE REQUEST or S-NODE RELEASE REQUEST) message, which may include a conditional configuration indication. The C-SN 106A sends 386, to the MN 104, an SN Release Request Acknowledge (e.g., SGNB RELEASE REQUEST ACKNOWLEDGE or S-NODE RELEASE REQUEST ACKNOWLEDGE) message, which may include the cell ID(s) of C-PSCell(s). In accordance with the cell ID(s) of the C-PSCell(s), the MN 104 can know which candidate cell(s) has been prepared by the C-SN 106A. Alternatively, the C-SN 106A does not include the cell ID(s) in the SN Release Request Acknowledge message. In this case, the MN 104 retains the cell ID(s) that the MN 104 received in the procedure 380 or 381.

After receiving 386 the SN Release Request Acknowledge message, the MN 104 determines 362 configuration ID(s) based on the cell ID(s) of each of the C-PSCell(s) when generating an RRC reconfiguration message. The MN 104 generates a conditional configuration release list (e.g., CondReconfigToRemoveList IE) where each entry includes a particular configuration ID. The MN 104 sends 387, to the UE 102, the RRC reconfiguration message including the conditional configuration release list. The UE 102 applies the RRC reconfiguration and sends 388, to the MN 104, an RRC reconfiguration complete message. The S-SN 106B may send 389, to the MN 104, an SN Status Transfer message. The MN 104 may send 397, to the S-SN 106B, a UE Context Release message, and may send 398, to the C-SN 106A, a UE Context Release message.

Next, several example methods that a base station can implement to support SN-initiated SN Change and manage conditional configurations are discussed with reference to FIGS. 4-11. As indicated at various points throughout the disclosure, the example methods depicted in FIGS. 4-11 may be implemented during the scenarios 300A-300G described above.

Figure 4:
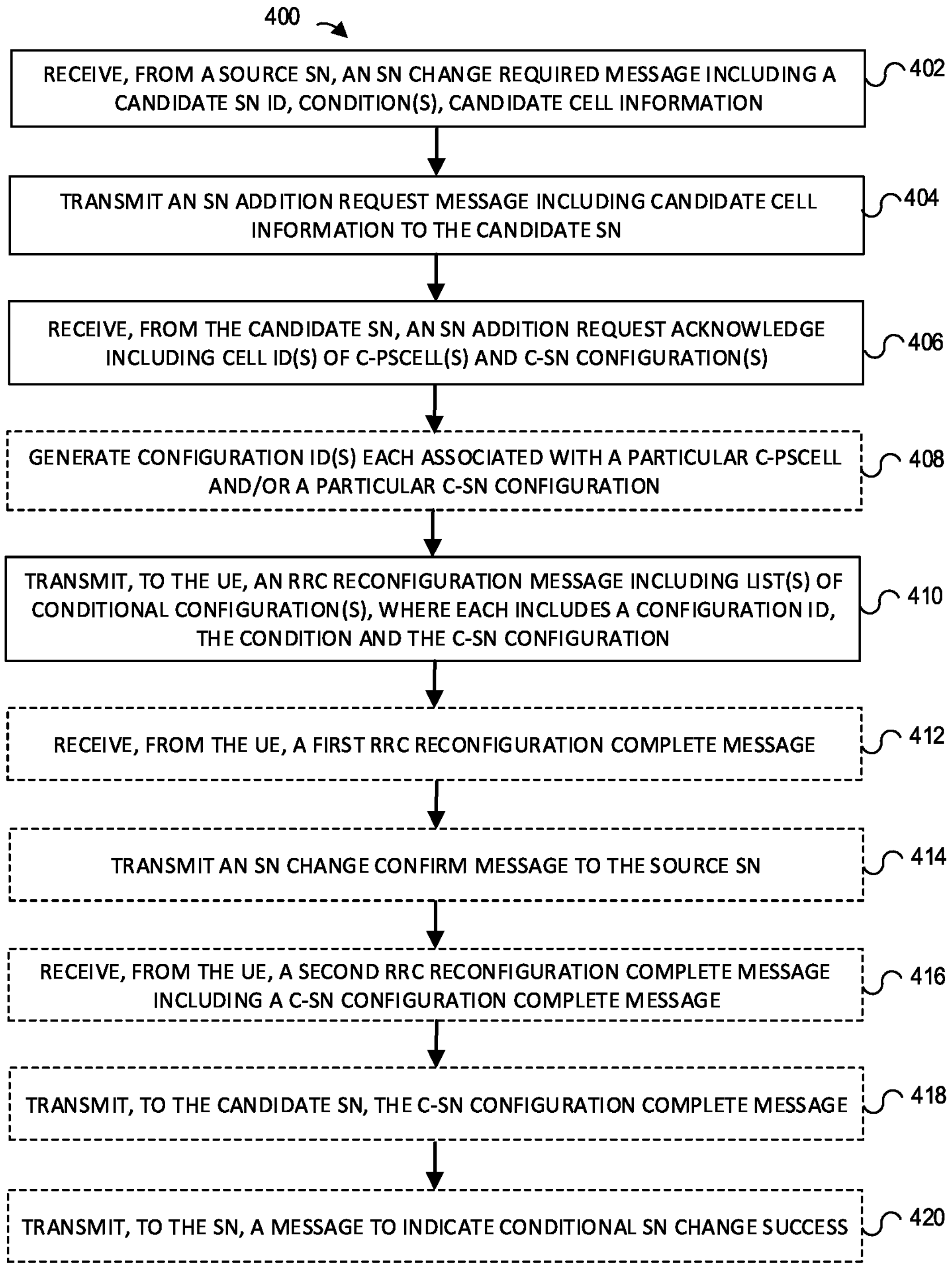
FIG. 4 is a flow diagram of an example method for preparing one or more conditional configurations for a UE via an SN-initiated conditional SN Change procedure, which can be implemented in the MN of this disclosure.

Referring first to FIG. 4, FIG. 4 illustrates an example method 400 for preparing an SN-initiated conditional SN Change for a UE, such as the UE 102, which can be implemented in a base station such as the MN 104 of FIGS. 3A, 3B, 3C, 3D, 3E, 3F, and 3G, for example.

The method 400 begins at block 402, where the base station receives, from another base station as the S-SN, an SN Change Required message including a Candidate SN Identity (e.g., Global en-gNB ID or Global NG-RAN Node ID), condition(s), candidate Cell Information, and/or an S-SN configuration (e.g., event 310 of FIG. 3A, event 311 of FIG. 3B). At block 404, the base station transmits, to the C-SN, an SN Addition Request message including a conditional indication, candidate cell information, and/or the SN configuration (e.g., event 318 of FIG. 3A, 3B). The base station, at block 406, receives, from the candidate SN, an SN Addition Request Acknowledge message including Cell ID(s) of C-PSCell(s) and C-SN configuration(s) (e.g., event 322 of FIG. 3A, 3B). At block 408, the base station may generate configuration ID(s) each associated with a particular C-PSCell and/or a particular C-SN Configuration (e.g., event 324 of FIG. 3A). In some implementations, the S-SN generates the configuration ID(s) (e.g., event 323 of FIG. 3B). At block 410, the base station transmits, to the UE, an RRC reconfiguration message including list(s) of conditional configuration(s) where each includes a configuration ID, the condition, and the C-SN configuration (e.g., event 326 of FIG. 3A, event 327 of FIG. 3B). The base station at block 412 may receive, from the UE, a first RRC reconfiguration complete message (e.g., event 328 of FIG. 3A, event 329 of FIG. 3B). The base station at block 414 may transmit, to the S-SN, an SN Change Confirm message, which may include accepted C-PSCell Information (e.g., event 330 of FIG. 3A, event 331 of FIG. 3B). The base station at block 416 may receive, from the UE, a second RRC reconfiguration complete message including a C-SN configuration complete message (e.g., event 340 of FIG. 3A). The base station at block 418 may transmit, to the C-SN, the C-SN configuration complete message (e.g., event 342 of FIG. 3A). The base station at block 420 may transmit, to the S-SN, a message to indicate the conditional SN change is successfully executed (e.g., event 344 of FIG. 3A).

Figure 5A:
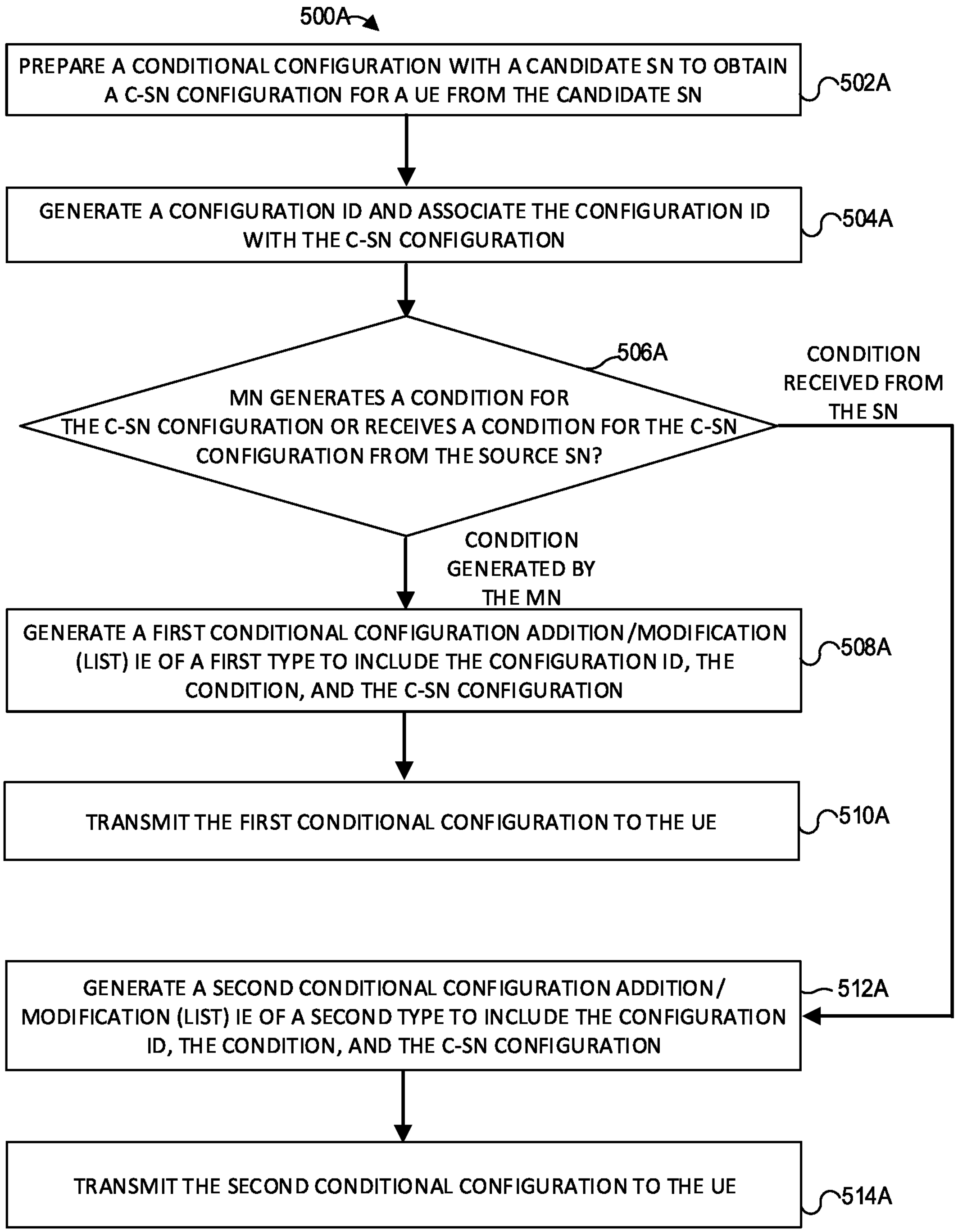
FIG. 5A is a flow diagram of an example method for preparing one or more conditional configurations for a UE via an SN-initiated conditional SN Change procedure, based on whether the MN generates a condition or receives a condition from the SN, which can be implemented in the MN of this disclosure.

Referring next to FIG. 5A, an example method 500A for preparing an SN-initiated conditional SN Change for a UE, such as the UE 102, is illustrated. The method 500A can be implemented in a base station such as the MN 104 of FIGS. 3A, 3B, 3C, and 3D, for example.

The method 500A begins at block 502A, where the base station prepares a conditional configuration with a C-SN to obtain a C-SN configuration for a UE from the C-SN. At block 504A, the base station generates a configuration ID and associates the configuration ID with the C-SN configuration (e.g., event 324 of FIG. 3A, event 362 of FIGS. 3C and 3D). The base station at block 506A checks whether the MN (i.e., the base station itself) generate a condition for the C-SN configuration or receives a condition for the C-SN configuration from an SN (i.e., the S-SN). If the condition is generated by the MN, the flow proceeds to block 508A, where the base station generates a first conditional configuration Addition/Modification (list) IE of a first type to include the configuration ID, the condition, and the C-SN configuration. The base station at block 510A transmits the first conditional configuration to the UE (e.g., event 326 of FIG. 3A, event 364 of FIGS. 3C and 3D). If the condition is received from the SN, the flow proceeds to block 512A, where the base station generates a second conditional configuration Addition/Modification (list) IE of a second type to include the configuration ID, the condition, and the C-SN configuration. The base station at block 514A transmits the second conditional configuration to the UE (e.g., event 326 of FIG. 3A, event 364 of FIGS. 3C and 3D).

In some implementations, the first conditional configuration/modification (list) IE of the first type can be a 3GPP Release 16 IE. For example, the 3GPP Release 16 IE can be a CondReconfigurationToAddMod-r16 or a CondReconfigurationToAddModList-r16 if the MN is an eNB. In another example, the 3GPP Release 16 IE can be a CondReconfigToAddMod-r16 or a CondReconfigToAddModList-r16. In some implementations, the second conditional configuration/modification (list) IE of the second type can be a 3GPP Release 17 IE. For example, the 3GPP Release 17 IE can be a CondReconfigurationToAddMod-r17, a CondReconfigurationToAddModList-r17, CondReconfigToAddMod-r17, or a CondReconfigToAddModList-r17.

The condition generated by the MN can be a sub-IE of the 3GPP release 16 IE. The MN can include the condition received from the SN in an Octet String with a corresponding field in the 3GPP Release 17 IE, so that the MN does not need to decode or comprehend the condition received from the source SN.

Figure 5B:
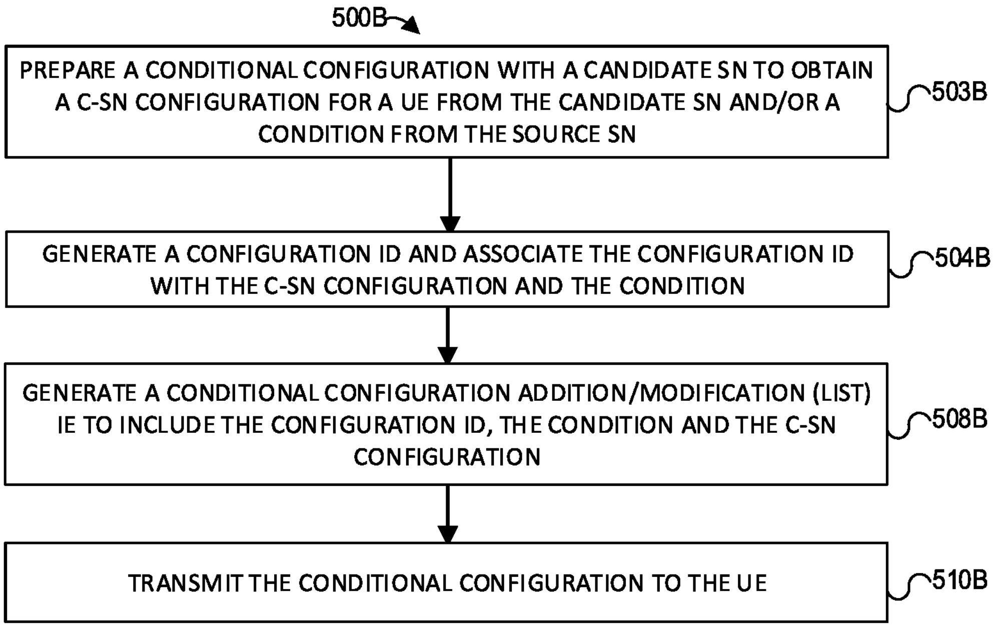
FIGS. 5B-5C are flow diagrams of further example methods for preparing one or more conditional configurations for a UE via an SN-initiated conditional SN Change procedure, which can be implemented in the MN of this disclosure.

Referring next to FIG. 5B, an example method 500B for preparing an SN-initiated conditional SN Change for a UE, such as the UE 102, is illustrated. The method 500B can be implemented in a base station such as the MN 104 of FIGS. 3A, 3B, 3C, and 3D for example.

The method 500B begins at block 503B, where the base station prepares a conditional configuration with a C-SN to obtain a C-SN configuration and/or a condition for a UE from the source SN. At block 504B, the base station generates a configuration ID and associates the configuration ID with the C-SN configuration and the condition (e.g., event 324 of FIG. 3A, event 362 of FIGS. 3C and 3D). The base station at block 508B generates a conditional configuration Addition/Modification (list) IE to include the configuration ID, the condition, and the C-SN configuration and/or a conditional configuration Release (list) IE to include the configuration ID. At block 510B the base station transmits the conditional configuration to the UE (e.g., event 326 of FIG. 3A, event 364 of FIGS. 3C and 3D).

Figure 5C:
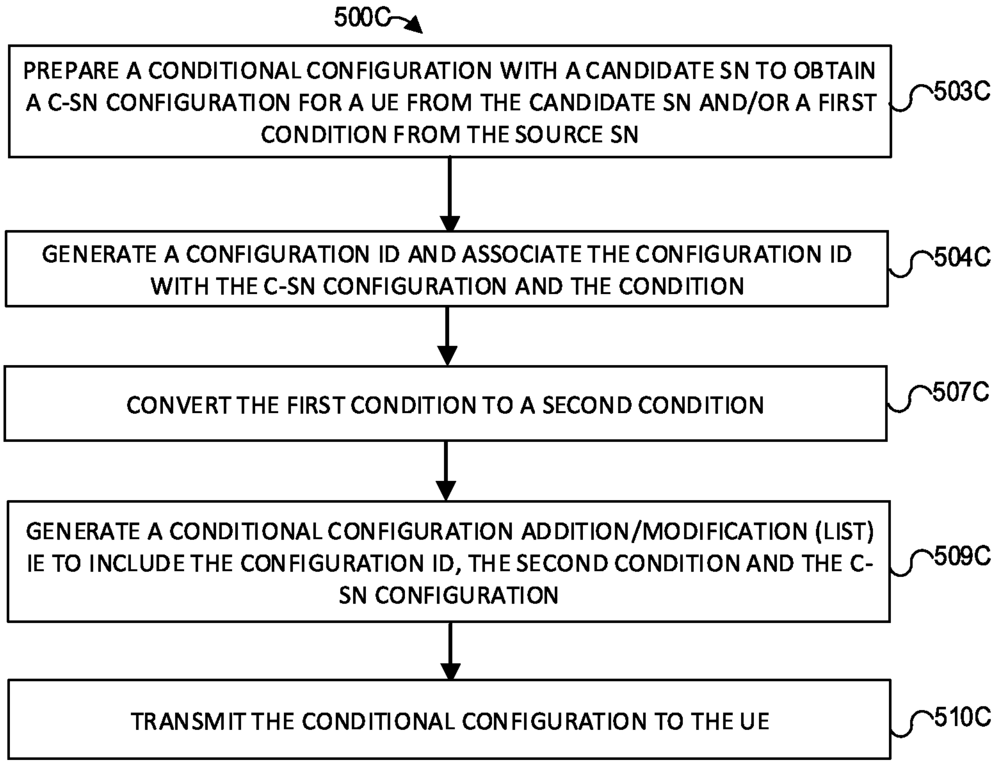

Referring next to FIG. 5C, an example method 500C is illustrated for preparing an SN-initiated conditional SN Change for a UE, such as the UE 102, which can be implemented in a base station such as the MN 104 of FIGS. 3A, 3C, and 3D for example.

The method begins at block 503C, where the base station prepares a conditional configuration with a C-SN to obtain a C-SN configuration and a first condition for a UE from the S-SN. At block 504C, the base station generates a configuration ID and associate the configuration ID with the C-SN configuration and the condition (e.g., event 324 of FIG. 3A, event 362 of FIGS. 3C and 3D). The base station at block 507C converts the first condition to a second condition. The base station at block 509C generates a conditional configuration Addition/Modification (list) IE to include the configuration ID, the second condition and the C-SN configuration. At block 510 the base station transmits the conditional configuration to the UE (e.g., event 326 of FIG. 3A, event 364 of FIGS. 3C and 3D).

In some implementations, the MN at block 507C decodes the first condition to obtain a plain text of the first condition and then encodes the plain text into the second condition. In some implementations, the first condition has a first format and the second condition has a second format. For example, the first format can be an SN format and the second condition can be an MN format. As another example, in a scenario involving EN-DC, the first format can be an NR format and the second format can be an LTE format. In other implementations, the first condition and the second condition have the same format.

Figure 6:
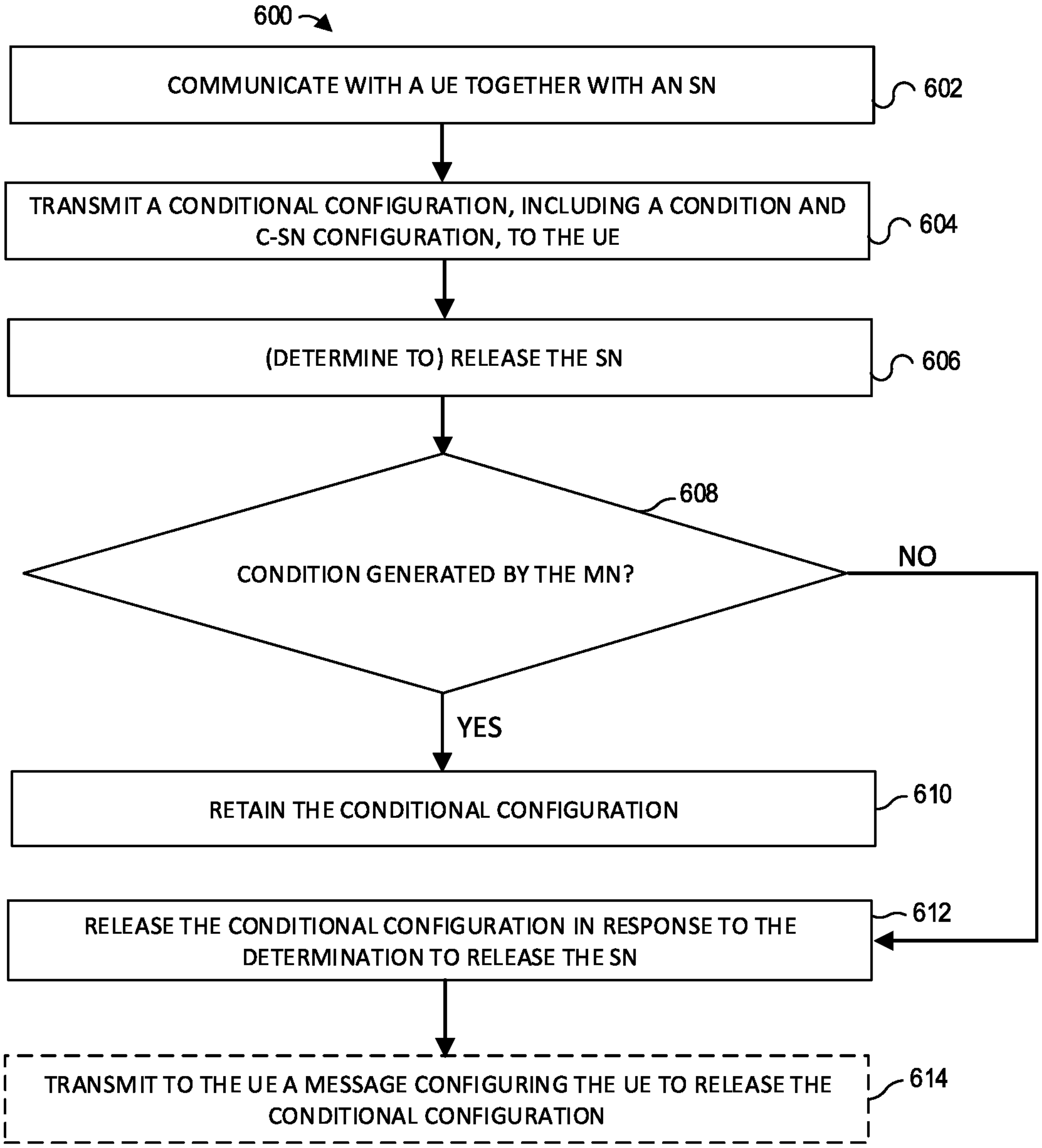
FIG. 6 is a flow diagram of an example method determining whether to release a C-SN after releasing an S-SN, which can be implemented in the MN of this disclosure.

Referring next to FIG. 6, an example method 600 for preparing an SN-initiated conditional SN Change for a UE, such as the UE 102, and later releasing the SN and the C-SN, is illustrated. The method 600 can be implemented in a base station such as the MN 104 of FIG. 3G or in a RAN, for example.

The method begins at block 602, where the base station communicates with a UE together with an SN. At block 604, the base station transmits a conditional configuration, including a condition and a C-SN configuration, to the UE. At block 606, the base station (determines to) release the SN (e.g., event 395 of FIG. 3G). At block 608, the base station checks whether the condition associated to the conditional configuration is generated by the MN (i.e., the base station itself). If so, the flow proceeds to block 610 where the base station retains the conditional configuration. If the condition is not generated by the MN, the flow proceeds to block 612 where the base station releases the conditional configuration in response to determining to release the SN. The base station, at block 614, may transmit to the UE a message configuring the UE to release the conditional configuration (e.g., event 387 of FIG. 3G).

Figure 7:
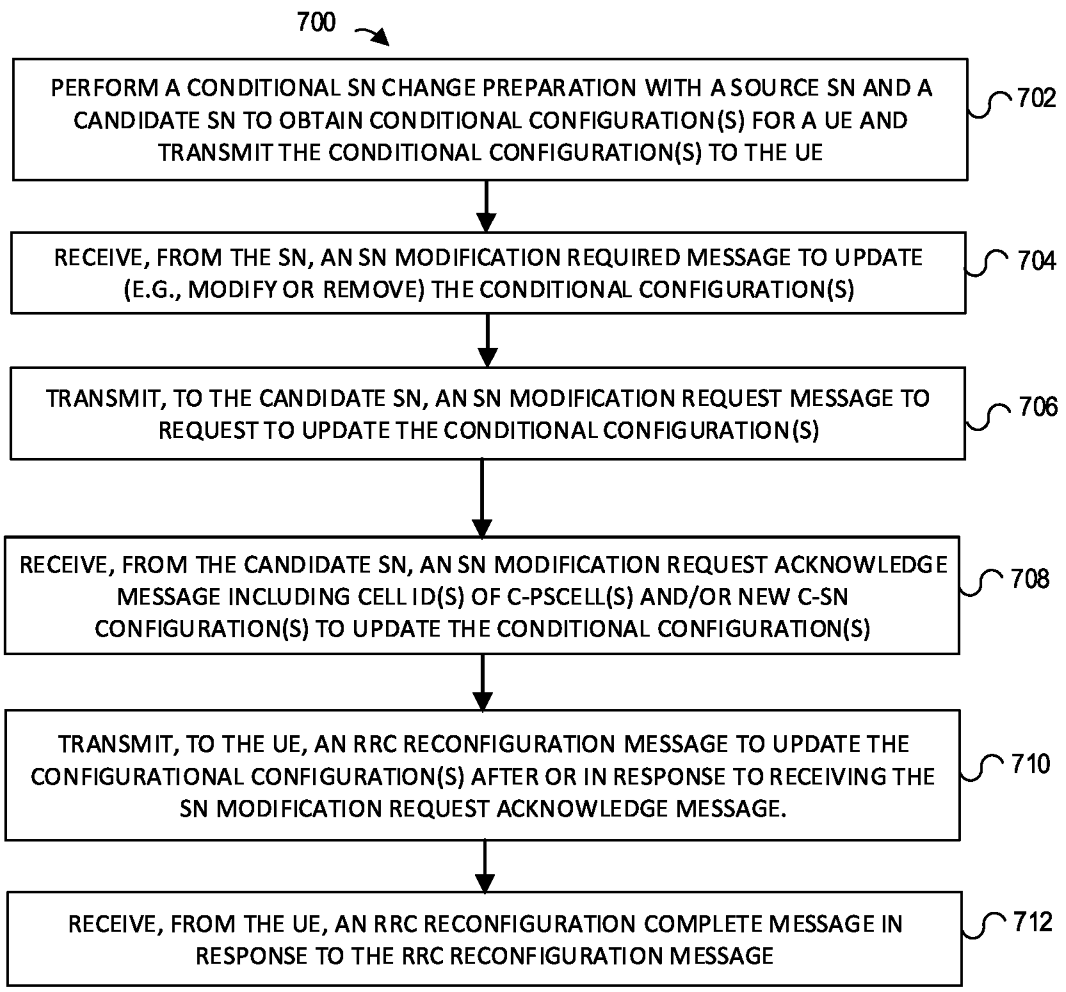
FIG. 7 is a flow diagram of an example method for modifying one or more conditional configurations in response to a request from the S-SN, which can be implemented in the MN of this disclosure.

Referring next to FIG. 7, an example method 700 for preparing an SN-initiated conditional SN Change for a UE, such as the UE 102, and later updating the conditional configurations, is illustrated. The method 700 can be implemented in a base station such as the MN 104 of FIG. 3C, 3E, or 3F, for example.

The method 700 begins at block 702, where the base station performs a conditional SN change preparation with an S-SN and a C-SN to obtain conditional configuration(s) for a UE and transmits the conditional configuration(s) to the UE (e.g., event 380 of FIGS. 3C and 3E). At block 704, the base station receives, from the S-SN, an SN Modification Required message to update (e.g., modify or remove) the conditional configuration(s) (e.g., event 354 of FIG. 3C or event 357 of FIG. 3E). The base station at block 706 transmits, to the C-SN, an SN Modification Request message to request the C-SN to update the conditional configuration(s) (e.g., event 356 of FIG. 3C or event 359 of FIG. 3E). At block 708, the base station receives, from the C-SN, an SN Modification Request Acknowledge message including cell ID(s) of C-PSCell(s) and/or new C-SN configuration(s) with which to update the conditional configuration(s) (e.g., event 360 of FIG. 3C or event 361 of FIG. 3E). For example, the SN Modification Request Acknowledge message may omit C-SN configurations in a scenario (e.g., the scenario 300F) in which the modified C-PSCells are cells that are removed. At block 710, the base station transmits, to the UE, an RRC reconfiguration message to update the configurational configuration(s) after or in response to receiving the SN Modification Request Acknowledge message (e.g., event 364 of FIG. 3C or event 365 of FIG. 3E). The base station at block 712 receives, from the UE, an RRC reconfiguration complete message in response to the RRC reconfiguration message (e.g., event 365 of FIG. 3C or event 366 of FIG. 3E).

Figure 8:
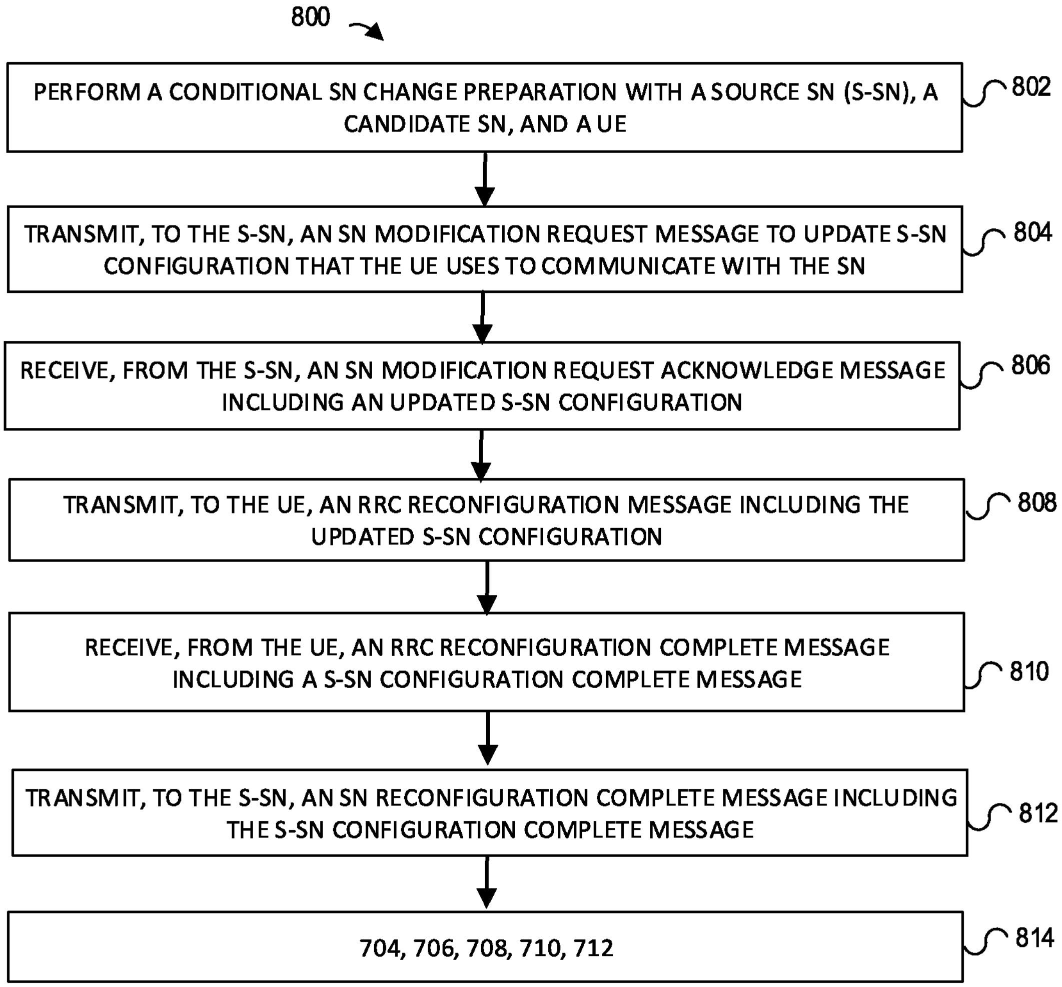
FIG. 8 is a flow diagram of an example method for updating a conditional configuration in response to a modified S-SN configuration, which can be implemented in the MN of this disclosure.

Referring next to FIG. 8, an example method 800 for preparing an SN-initiated conditional SN Change for a UE, such as the UE 102, and later updating the S-SN configuration and the conditional configurations, is illustrated. The method 800 can be implemented in a base station such as the MN 104 of FIG. 3F, for example.

The method 800 begins at block 802, where the base station performs a conditional SN change preparation with an S-SN, a C-SN, and a UE (e.g., event 380 or 381 of FIG. 3F). At block 804, the base station transmits, to the S-SN, an SN Modification Request message to update the S-SN configuration that the UE uses to communicate with the S-SN (e.g., event 372 of FIG. 3F). At block 806, the base station receives, from the S-SN, an SN Modification Request Acknowledge message including an updated S-SN configuration (e.g., event 374 of FIG. 3F). At block 808, the base station transmits, to the UE, an RRC reconfiguration message including the updated S-SN configuration (e.g., event 376 of FIG. 3F). The base station at block 810 receives, from the UE, an RRC reconfiguration complete message including an S-SN configuration complete message (e.g., event 378 of FIG. 3F). At block 812, the base station transmits, to the S-SN, an SN Reconfiguration Complete message including the S-SN configuration complete message (e.g., event 331 of FIG. 3F). At block 814, the base station performs the SN-initiated SN Modification on Conditional SN Change preparation as specified in the blocks 704, 706, 708, 710, 712. At block 704, the base station may receive the S-SN configuration (e.g., event 354 of FIG. 3C). At block 706, the base station may transmit the S-SN configuration to the C-SN (e.g., event 356 of FIG. 3C).

Figure 9:
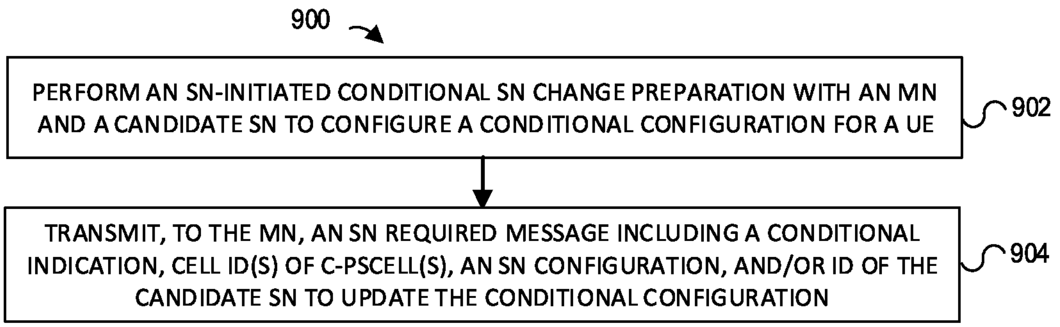
FIG. 9 is a flow diagram of an example method for instructing an MN to update prepared conditional configurations, which can be implemented in the S-SN of this disclosure.

Referring next to FIG. 9, an example method 900 is illustrated for preparing an SN-initiated conditional SN Change for a UE, such as the UE 102, and later updating the conditional configurations. The method 900 can be implemented in a base station such as the S-SN 106B of FIGS. 3C. 3E and 3F, for example.

The method 900 begins at block 902, where the base station performs an SN-initiated conditional SN change preparation with an MN and a candidate SN to configure a conditional configuration for a UE (e.g., event 380 or 381 of FIGS. 3C, 3E, and 3F). The base station at block 904 transmits, to the MN, an SN Required message to update the conditional configuration (e.g., event 354 of FIG. 3C, event 357 of FIG. 3E). The SN Required message includes an indication of the C-PSCells to be modified (e.g., cell ID(s) of C-PSCell(S) and/or an ID of the C-SN). The SN Required message may further include a conditional indication, and/or an SN configuration. In some implementations, the SN Required message can be an SN Modification Required message. In other implementations, the SN Required message can be an SN Change Required message. In some implementations, the conditional configuration includes a condition and/or a C-SN configuration.

Figure 10:
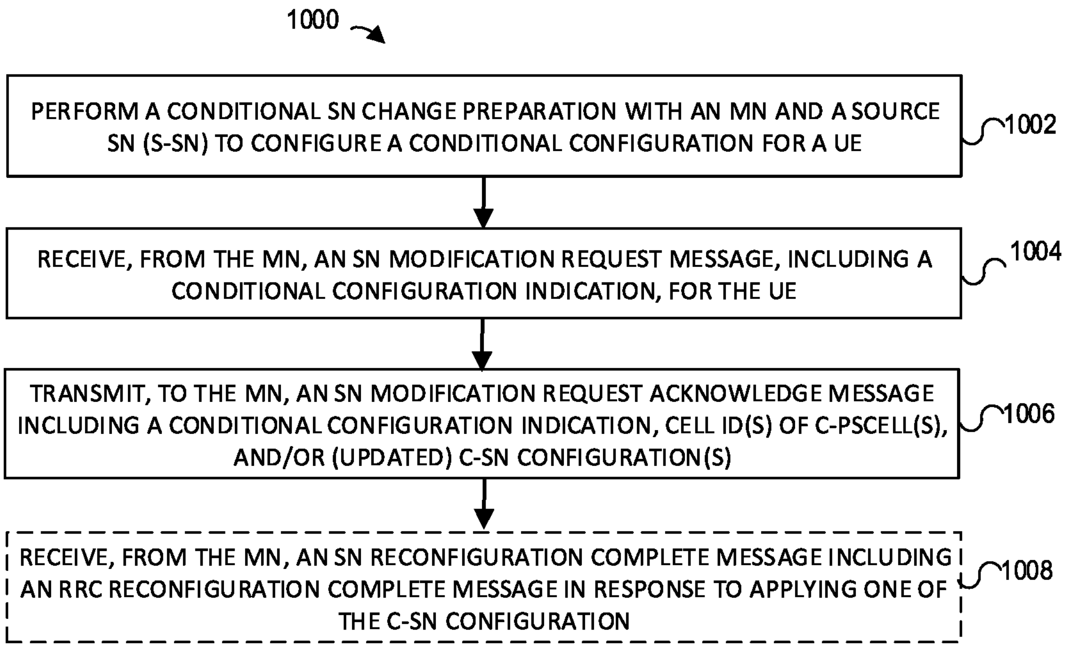
FIG. 10 is a flow diagram of an example method for updating prepared conditional configurations in response to a request from an MN, which can be implemented in the C-SN of this disclosure.

Referring next to FIG. 10, an example method 1000 for preparing an SN-initiated conditional SN Change for a UE, such as the UE 102, and later updating the conditional configurations, is illustrated. The method 1000 can be implemented in a base station such as the C-SN 106A of FIG. 3C, 3E or 3F, for example.

The method 1000 begins at block 1002, where the base station perform a conditional SN change preparation with an MN and an S-SN to configure a conditional configuration for a UE (e.g., event 380 of FIGS. 3C, 3E, and 3F). The base station at block 1004 receives, from the MN, an SN Modification Request message including a conditional indication, for the UE (e.g., event 356 of FIG. 3C, event 359 of FIG. 3E). The base station at block 1006 transmits, to the MN, an SN Modification Request Acknowledge message including a conditional configuration indication, cell ID(s) of C-PSCell(s), and/or (updated) C-SN configuration(s) (e.g., event 368 of FIG. 3C, event 368 of FIG. 3E). The base station at block 1008 may receive, from the MN, an SN Reconfiguration Complete message including an RRC Reconfiguration Complete message in response to the UE applying one of the C-SN configurations.

Figure 11:
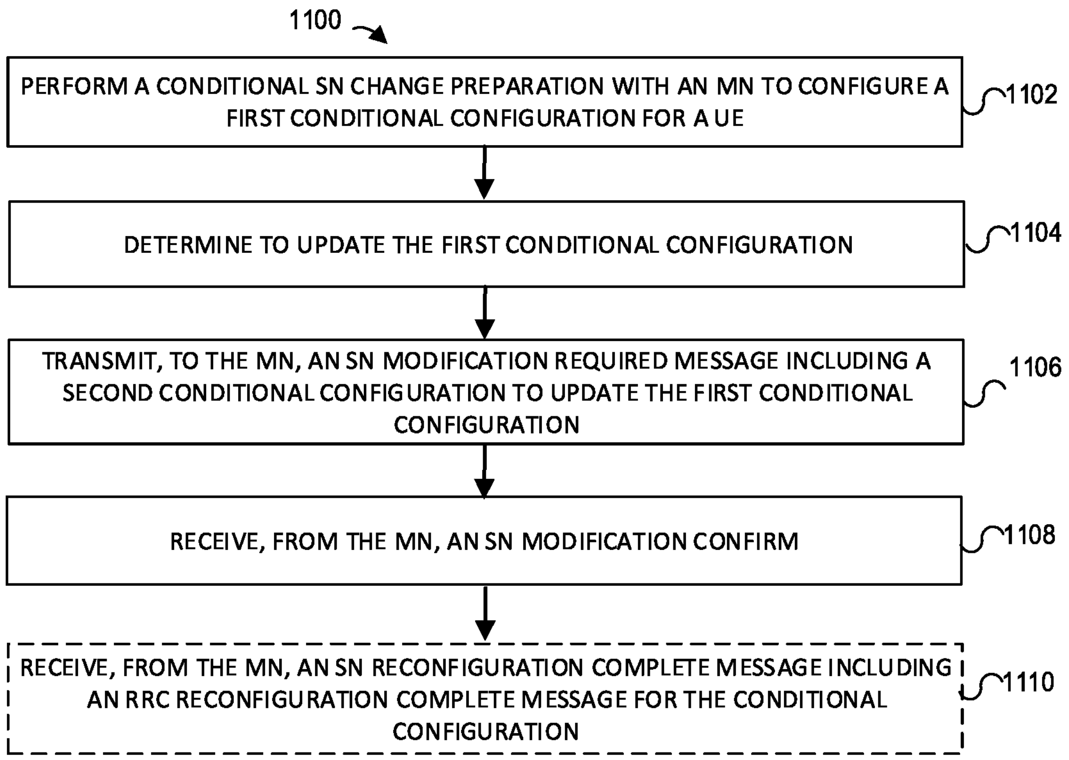
FIG. 11 is a flow diagram of an example method for updating prepared conditional configurations, which can be implemented in the C-SN of this disclosure.

Referring next to FIG. 11, an example method 1100 for preparing an SN-initiated conditional SN Change for a UE, such as the UE 102, and later updating the conditional configurations, is illustrated. The method 1100 can be implemented in a base station such as the C-SN 106A of FIG. 3D, for example.

The method 1100 begins at block 1102, where the base station perform a conditional SN change preparation with an MN to configure a first conditional configuration for a UE. At block 1104, the base station may decide to update the first conditional configuration (e.g., event 392 of FIG. 3D). The base station at block 1106 transmits, to the MN, an SN Modification Required message including a second conditional configuration to update the first conditional configuration (e.g., event 355 of FIG. 3D). The base station at block 1108 receives, from the MN, an SN Modification Confirm message (e.g., event 357 of FIG. 3D). The base station at block 1110 may receive, from the MN, an SN Reconfiguration Complete message including an RRC reconfiguration complete message for the conditional configuration. In some implementations, the conditional configuration includes a condition and/or a C-SN configuration.

Figure 12:
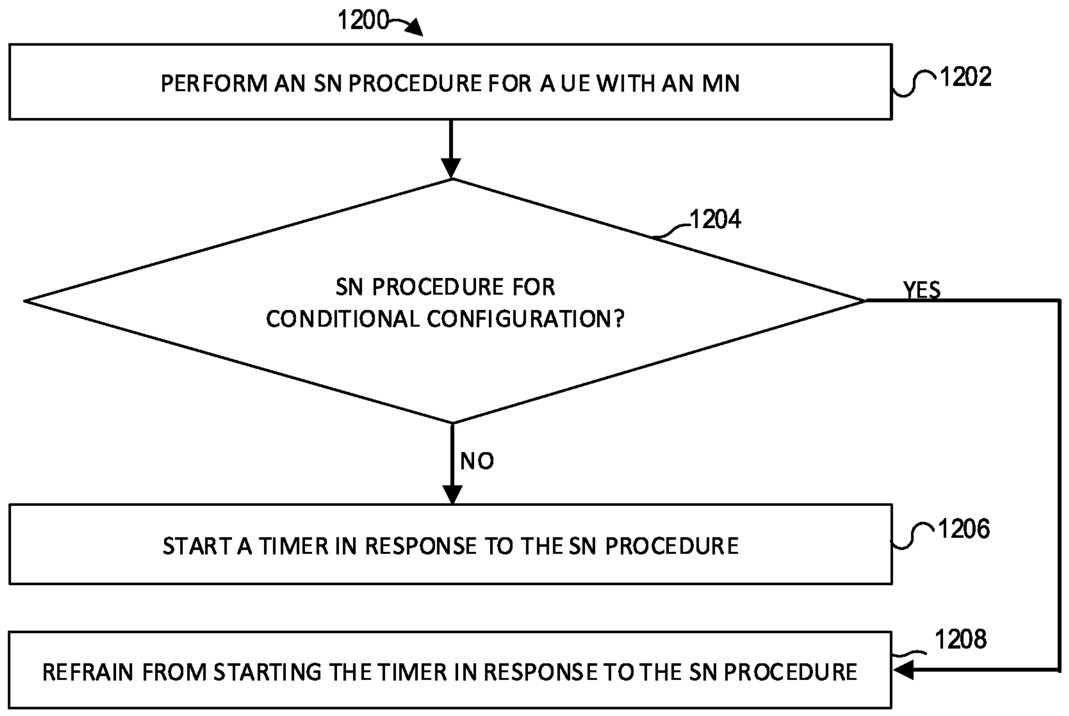
FIG. 12 is a flow diagram of an example method for determining whether to start a timer in response to performing an SN procedure, based on whether or not the SN procedure is a conditional procedure, which can be implemented in the S-SN or a target/candidate SN of this disclosure.
Figure 13:
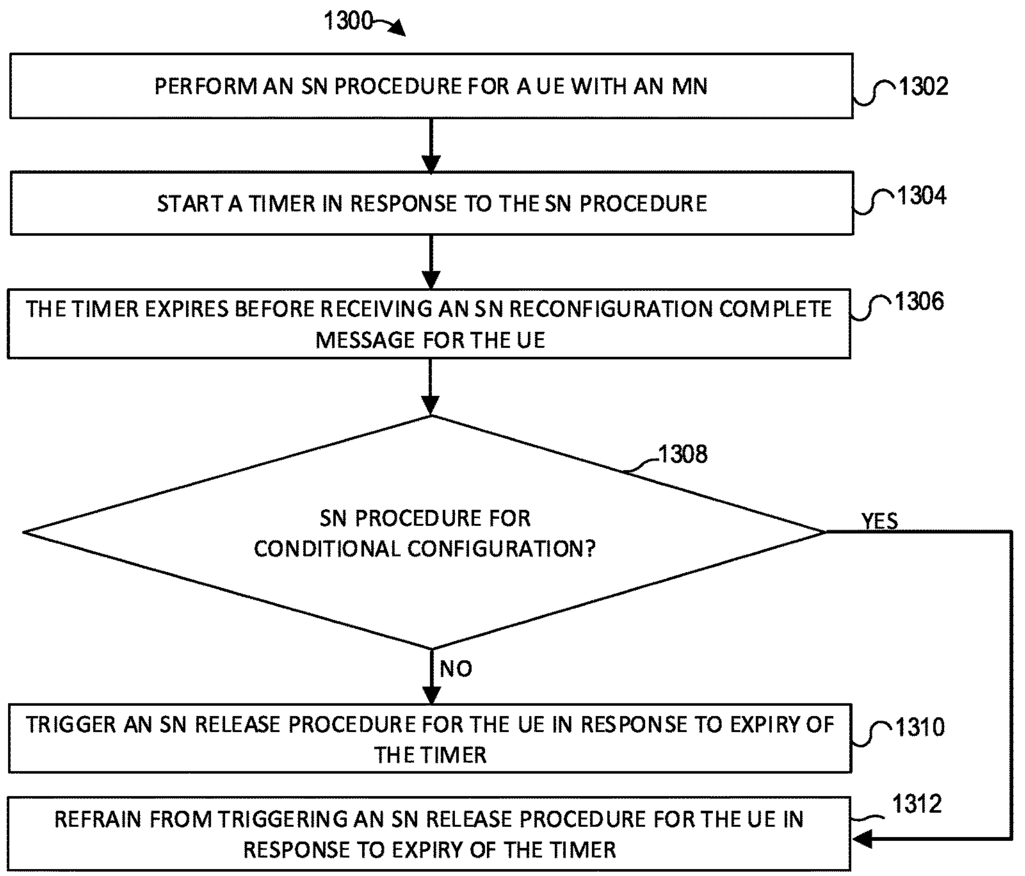
FIG. 13 is a flow diagram of an example method for determining whether to trigger an SN release procedure when a timer related to an SN procedure expires, based on whether or not the SN procedure is a conditional procedure, which can be implemented in the S-SN or a target/candidate SN of this disclosure.
Figure 14:
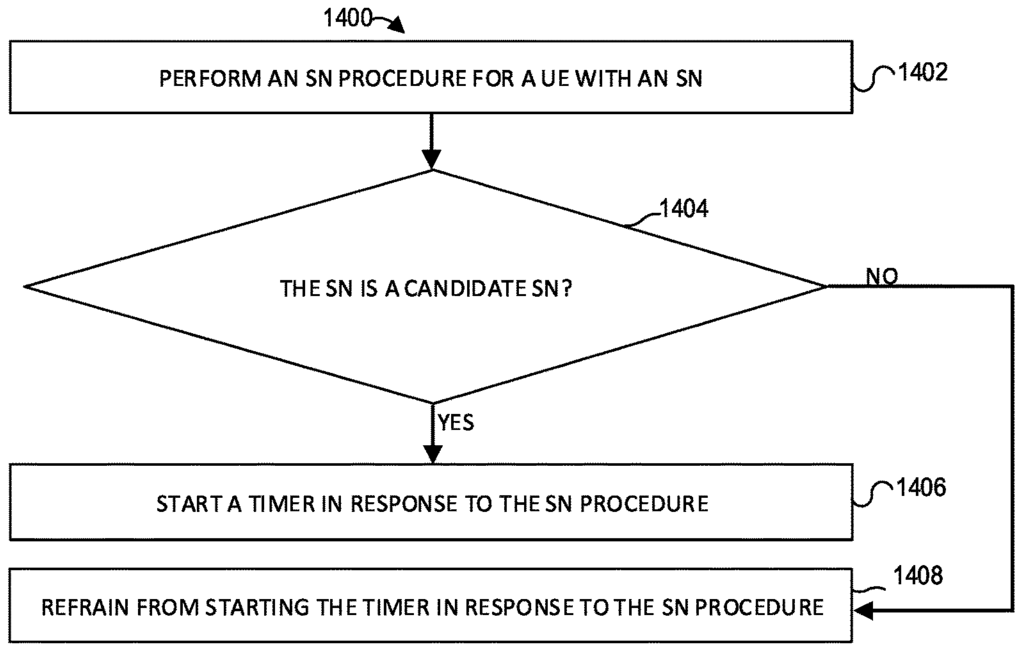
FIG. 14 is a flow diagram of an example method for determining whether to start a timer in response to performing an SN procedure, based on whether the NS procedure is a conditional procedure, which can be implemented in the MN of this disclosure.

Turning next to FIGS. 12-14, FIGS. 12-14 illustrate example methods for supporting SN procedures and managing timers related to the SN procedures, which can be implemented by the base stations of this disclosure (e.g., the MN 104, S-SN 106B, or C-SN 106A of FIGS. 3A-3F). During the scenarios 300A-300F, for example, a base station can determine whether or not to start a timer in accordance with the techniques illustrated in FIGS. 12-14.

FIG. 12 illustrates an example method 1200 for determining whether to start a timer in response to performing an SN procedure, based on whether or not the SN procedure is a conditional procedure. The method 1200 can be implemented in a base station such as the S-SN 106B or C-SN 106A of FIGS. 3A, 3B, 3C, 3D, 3E and 3F, for example.

The method 1200 begins at block 1202, where the base station performs an SN procedure for a UE (e.g., the UE 102) with an MN (e.g., events 318 and 322 of FIG. 3A, events 318 and 322 of FIG. 3B, events 356 and 360 of FIG. 3C, events 355 and 357 of FIG. 3D, events 359 and 361 of FIG. 3E). At block 1204, the base station checks whether the SN procedure is for conditional configuration. If not, the flow proceeds to block 1206 where the base station starts a timer in response to the SN procedure. If the SN procedure is for conditional configuration at block 1204, the flow proceeds to 1208 where the base station refrains from starting the timer in response to the SN procedure.

In some implementations, the SN procedure can be an SN Addition procedure. The SN Addition procedure may be an MN-initiated (conditional) SN Addition or Change procedure, or an SN-initiated (conditional) SN Change procedure. In some implementations, the MN (e.g., MN 104) can perform an immediate handover or a conditional handover with a base station (e.g., target MN or candidate MN), and the base station can perform an MN-initiated (conditional) SN Addition or Change procedure with another base station (e.g., C-SN 106A). In other implementations, the SN procedure can be an SN Modification preparation procedure. The SN Modification preparation procedure can be an MN-initiated SN Modification procedure or an SN-initiated SN Modification procedure. In yet another implementations, the SN procedure can be an SN Change procedure.

In some implementations, the timer can be a $TXn_{DCoverall}$ defined in 3GPP specification 38.423 or a $T_{DCoverall}$ defined in 3GPP specification 36.423.

In some implementations, in the SN procedure, the base station receives an SN Request message (e.g., SN Addition Request message or SN Modification Request message) from the MN and sends an SN Request Acknowledge message (e.g., SN Addition Request Acknowledge message or SN Modification Request Acknowledge message) to the MN in response to the SN Request message. In some implementations, the base station at block 1206 starts the timer in response to receiving the SN Request message from the MN. In other implementations, the base station at block 1206 starts the timer in response to sending the SN Request Acknowledge message to the MN. The base station stops the timer when receiving, from the MN, an SN Reconfiguration Complete message including an RRC Reconfiguration Complete message of the UE.

In some implementations, in the SN procedure, the base station sends an SN Required message (e.g., SN Modification Required or SN Change Required message) to the MN. In some implementations, the base station at block 1206 starts the timer in response to sending the SN Required message. The base station stops the timer when receiving, from the MN, an SN Confirm message (e.g., SN Modification Confirm or SN Change Confirm message).

In some implementations, if the timer expires before receiving an SN Reconfiguration Complete message for the UE, the base station regards an RRC reconfiguration procedure requested by the SN procedure as not applied by the UE.

FIG. 13 illustrates a method 1300 for determining whether to trigger an SN release procedure when a timer related to an SN procedure expires. The method 1300 can be implemented in a base station such as the S-SN 106B or C-SN 106A of FIGS. 3A, 3B, 3C. 3D, 3E and 3F, for example.

The method 1300 begins at block 1302 where the base station performs an SN procedure for a UE with an MN. The base station at block 1304 starts a timer in response to the SN procedure. At block 1306, the timer expires before receiving an SN Reconfiguration Complete message for the UE. At block 1308, the base station checks whether the SN procedure is for conditional configuration. If not, the flow proceeds to block 1310 where the base station triggers an SN release procedure for the UE in response to expiry of the timer. If the SN procedure is for conditional configuration, the flow proceeds to block 1312 where the base station refrains from triggering an SN release procedure for the UE in response to expiry of the timer.

In some implementations, the SN procedure can be an SN Addition procedure. The SN Addition procedure may be an MN-initiated (conditional) SN Addition or Change procedure, or an SN-initiated (conditional) SN Change procedure. In some implementations, the MN (e.g., MN 104) can perform an immediate handover or a conditional handover with a base station (e.g., target MN or candidate MN), and the base station can perform an MN-initiated (conditional) SN Addition or Change procedure with another base station (e.g., C-SN 106A). In other implementations, the SN procedure can be an SN modification preparation procedure. The SN Modification preparation procedure can be an MN-initiated SN Modification procedure or an SN-initiated SN Modification procedure.

In some implementations, in the SN procedure, the base station receives an SN Request message (e.g., SN Addition Request message or SN Modification Request message) from the MN and sends an SN Request Acknowledge message (e.g., SN Addition Request Acknowledge message or SN Modification Request Acknowledge message) to the MN in response to the SN Request message. In some implementations, the base station at block 1304 starts the timer in response to receiving the SN Request message from the MN. In other implementations, the base station at block 1304 starts the timer in response to sending the SN Request Acknowledge message to the MN. The base station stops the timer when the base station receives, from the MN, an SN Reconfiguration Complete message including an RRC Reconfiguration Complete message of the UE.

In some implementations, the timer can be a $TXn_{DCoverall}$ defined in 3GPP specification 38.423 or a $T_{DCoverall}$ defined in 3GPP specification 36.423.

In some implementations, if the SN procedure is not for the conditional configuration and the timer expires before receiving an SN Reconfiguration Complete message for the UE, the base station regards an RRC reconfiguration procedure requested by the SN procedure as not applied by the UE. If the SN procedure is for the conditional configuration and the timer expires before receiving an SN Reconfiguration Complete message for the UE, the base station does not regard an RRC reconfiguration procedure for the conditional reconfiguration requested by the SN procedure as not applied by the UE.

FIG. 14 illustrates an example method 1400 for determining whether to start a timer in response to performing an SN procedure, which can be implemented in a base station such as the MN 104 of FIGS. 3A, 3B, 3C, 3D, 3E, 3F, and 3G, for example.

The method 1400 begins at block 1402 where the base station performs an SN procedure for a UE with an SN. At block 1404, the base station checks whether the SN is a candidate SN. If so, the flow proceeds to block 1406 where the base station starts a timer in response to the SN procedure. If the SN is not a candidate SN, the flow proceeds to block 1408 where the base station refrains from starting the timer in response to the SN procedure.

In some implementations, the SN procedure can be an SN Addition procedure. The SN Addition procedure may be an MN-initiated (conditional) SN Addition or Change procedure, or an SN-initiated (conditional) SN Change procedure. In some implementations, the MN (e.g., MN 104) can perform an immediate handover or a conditional handover with a base station (e.g., target MN or candidate MN), and the base station can perform an MN-initiated (conditional) SN Addition or Change procedure with another base station (e.g., C-SN 106A). In other implementations, the SN procedure can be an SN modification preparation procedure. The SN Modification preparation procedure can be an MN-initiated SN Modification procedure or an SN-initiated SN Modification procedure.

In some implementations, in the SN procedure, the MN sends an SN Request message to the MN and receives an SN Request Acknowledge message from the MN in response to the SN Request message. In some implementations, the MN at block 1406 starts the timer in response to sending the SN Request message to the C-SN. In other implementations, the MN at block 1406 starts the timer in response to receiving the SN Request Acknowledge message from the C-SN. In yet another implementations, the MN obtains a conditional configuration in response to the SN procedure and at block 1406 starts the timer in response to transmitting the conditional configuration to the UE. For example, the MN can transmit an RRC reconfiguration message including the conditional configuration to the UE. In this case, the MN station stops the timer when receiving an RRC reconfiguration complete message from the UE in response to the RRC reconfiguration message. In another case, the MN station stops the timer when receiving an acknowledge message (e.g., HARQ acknowledgement or RLC acknowledgement) acknowledging reception of a HARQ transmission or a RLC PDU including the RRC reconfiguration message.

If the timer expires before receiving the RRC reconfiguration complete message, HARQ acknowledgement or RLC acknowledgement, the MN can perform an SN release procedure with the C-SN to release the conditional configuration.

Figure 15:
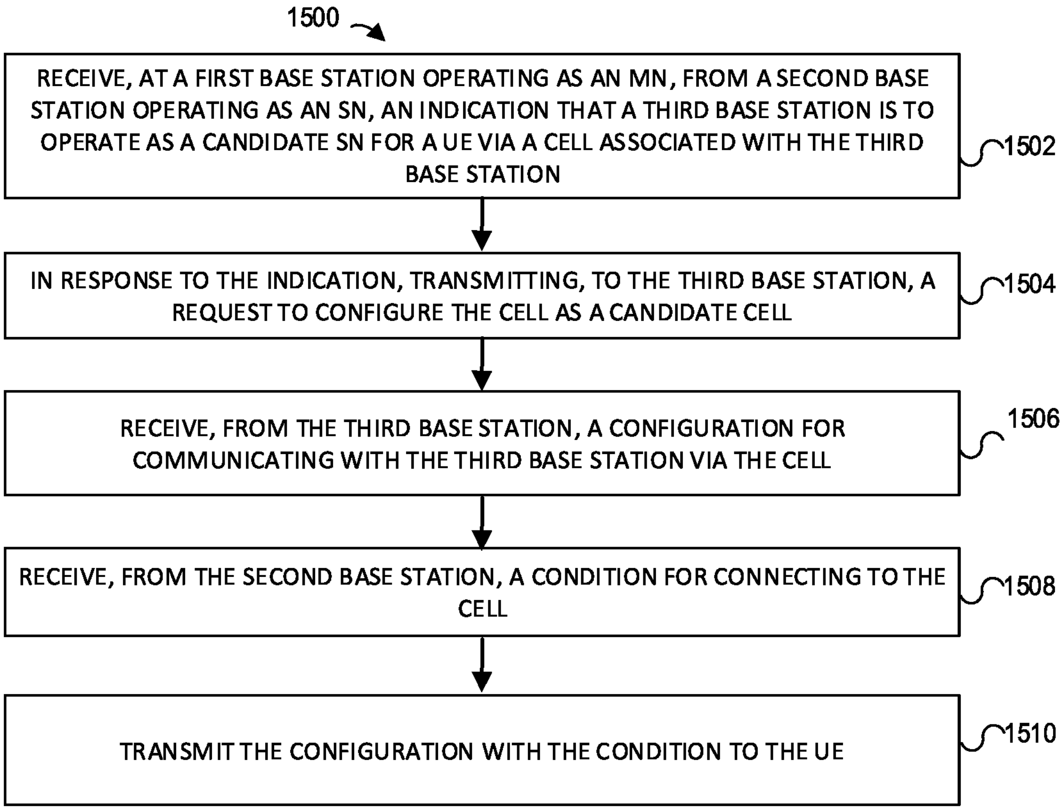
FIG. 15 is a method in a base station, operating as an MN, for supporting a conditional SN procedure, which can be implemented by a base station of this disclosure.
Figure 16:
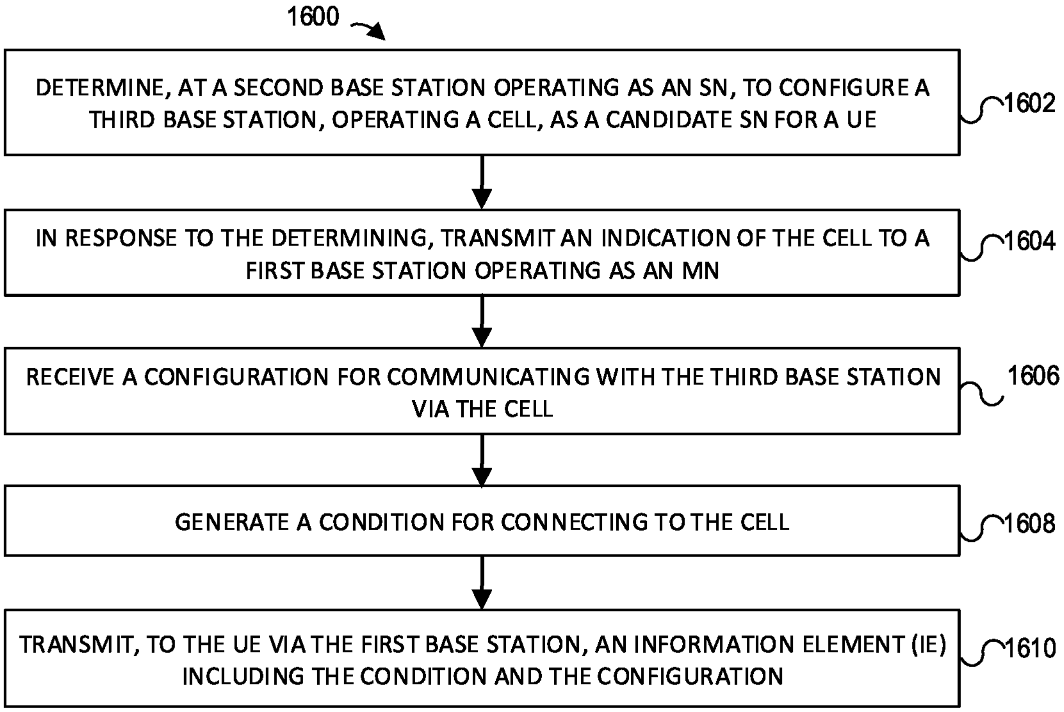
FIG. 16 is a method in a base station, operating as an SN, for supporting a conditional SN procedure, which can be implemented by a base station of this disclosure.

FIGS. 15-16 are flow diagrams illustrating example methods of this disclosure for supporting a conditional SN procedure. The example methods depicted in FIGS. 15-16 may be implemented during the scenarios 300A-300G described above.

FIG. 15 illustrates a method 1500 for supporting a conditional SN procedure, which can be implemented by a first base station operating as an MN (e.g., the MN 104). At block 1502, the first base station receives, from a second base station operating as an SN, an indication that a third base station is to operate as a candidate SN for a UE via a cell associated with the third base station (e.g., events 310 of FIG. 3A, 311 of FIG. 3B). At block 1504, in response to the indication, the first base station transmits, to the third base station, a request to configure the cell as a candidate cell (e.g., event 318 of FIG. 3B). At block 1506, the first base station receives, from the third base station, a configuration for communicating with the third base station via the cell (e.g., event 322 of FIG. 3B). At block 1508, the first base station receives, from the second base station, a condition for connecting to the cell (e.g., events 310 of FIG. 3A, 325 of FIG. 3B). At block 1510, the first base station transmits the configuration with the condition to the UE (e.g., events 326 of FIG. 3A, 327 of FIG. 3B).

In some implementations, receiving the condition at block 1502 includes receiving the condition with the indication (e.g., event 310 of FIG. 3A). The cell may be one of a plurality of cells operated by the third base station and configured to operate as candidate cells. The first base station may assign an identifier to each cell of the plurality of cells (e.g., event 324 of FIG. 3A), and transmit the identifier assigned to the cell to the UE with the configuration and the condition (e.g., event 326 of FIG. 3A). Further, receiving the condition at block 1502 may include receiving the condition formatted in accordance with a protocol that terminates at the UE and the SN. The first base station may generate an IE including the configuration and the condition, the IE formatted in accordance with a protocol that terminates at the UE and the MN (e.g., block 512A of FIG. 5A), and transmit the configuration to the UE with the condition by transmitting the IE to the UE.

In other implementations, after receiving the configuration from the third base station and prior to transmitting the configuration to the UE, the first base station transmits the configuration to the second base station (e.g., event 331 of FIG. 3B), and receives the condition with the configuration from the second base station (e.g., event 325 of FIG. 3B). Receiving the condition and receiving the configuration from the second base station may include receiving an IE including the configuration and the condition, and the first base station may transmit the configuration with the condition by transmitting the IE to the UE. The IE may be formatted in accordance with a protocol that terminates at the UE and the SN.

In some implementations, the method 1500 further includes determining to release the second base station as the SN (e.g., event 395 of FIG. 3G, block 606 of FIG. 6), and, in response, transmitting an SN release request to the third base station (e.g., event 385 of FIG. 3G, block 612 of FIG. 6).

In some implementations, the method 1500 further includes determining to modify an SN configuration via which the UE communicates with the second base station (e.g., event 394 of FIG. 3F). The first base station may request a modified SN configuration from the second base station (e.g., event 372 of FIG. 3F, block 804 of FIG. 8), and receive the modified SN configuration from the second base station (e.g., event 374 of FIG. 3F, block 806 of FIG. 8). In response to determining to modify the SN configuration, the first base station may transmit, to the third base station, a request to modify the configuration (e.g., event 370 of FIG. 3F, 356 of FIG. 3C, block 814 of FIG. 8). In the request to the third base station, the first base station may include the modified SN configuration.

In some implementations, the method 1500 further includes receiving a first request from the second base station to modify or remove at least a portion of the one or more configurations (e.g., event 354 of FIG. 3C, 357 of FIG. 3E, block 704 of FIG. 7). In such implementations, the first base station may transmit a second request to the third base station to modify or remove at least a portion of the one or more configurations (e.g., event 356 of FIG. 3C, 359 of FIG. 3E, block 706 of FIG. 7).

Further, the first base station may receive, from the third base station, a modified configuration for communicating with the third base station via the cell (e.g., event 355 of FIG. 3D, block 1106 of FIG. 11). The first base station can transmit the modified configuration to the UE (e.g., event 364).

FIG. 16 illustrates a method 1600 for supporting a conditional SN procedure, which can be implemented by a second base station operating as an SN (e.g., the S-SN 106B). At block 1602, the second base station determines to configure a third base station, operating a cell, as a candidate SN for a UE. At block 1604, in response to the determining, the second base station transmits an indication of the cell to a first base station operating as a master node (MN) (e.g., event 311 of FIG. 3B). At block 1606, the second base station receives a configuration for communicating with the third base station via the cell (e.g., event 331 of FIG. 3B). The second base station may receive the configuration from the first base station. At block 1608, the second base station generates a condition for connecting to the cell. At block 1610, the second base station transmits, to the UE via the first base station, an information element (IE) including the condition and the configuration (e.g., events 325 and 327 of FIG. 3B). The second base station may format the IE in accordance with a protocol that terminates at the UE and the SN.

The cell may be one of a plurality of cells operated by the third base station and configured to operate as candidate cells. In such cases, the second base station may assign an identifier to each cell of the plurality of cells (e.g., event 323 of FIG. 3B). The second base station may include, in the IE that the second base station transmits at block 1610, the identifier assigned to the cell (e.g., events 325 and 327 of FIG. 3B).

In some implementations, the method 1600 further includes determining to modify the configuration (e.g., event 391 of FIG. 3C, 393 of FIG. 3E), and transmitting a request to modify the configuration to the first base station (e.g., event 354 of FIG. 3C, 357 of FIG. 3E, block 904 of FIG. 9).

The following discussion on conditional handover with SCG configuration scenarios includes observations on scenarios and questions raised by RAN2 in LS R3-211433. From LS R3-211433: "As per the aforementioned agreement, the SCG configuration is applied only when the conditional reconfiguration for a PCell is met and CHO is executed. This agreement neither was captured in the specification, nor consulted with RAN3 so far. RAN2 has identified the following potential scenarios for conditional reconfiguration with SCG configuration: (1) CHO with same SN: CHO from source PCell 1 with SCG in SN 1 to target PCell 2 with SCG in the same SN 1. (2) CHO with different SNs: CHO from source PCell 1 with SCG in SN 1 to target PCell 2 with SCG in SN 2. (3) CHO from single-connectivity to an (MR-)DC connection: CHO from source PCell 1 to target PCell 2 with SCG in SN. (4) Scenarios 1, 2, 3, listed above, with target MCG and SCG in the same network node. This corresponds to the case where the UE is connected to two gNB-DUs in NR-DC, one serving the target MCG and the other serving the target SCG, connected to the same gNB-CU acting both as MN and SN." We understood that the first three scenarios concern the case where the SN is another logical node not co-located with the MN so that an SN addition procedure is required as shown in sections 10.7 and 10.9 of TS 37.340. It seems that the target/candidate MN in these scenarios performs an "immediate" SN addition as specified in the current RAN3 specifications as we haven't introduced the CPA or inter-SN CPC in Release 16. Therefore, the SN shall start a timer (e.g., $T_{DCoverall}$ or $TXn_{DCOverall}$) when it sends the SN Addition Request Acknowledge message to the MN and shall stop the timer upon reception of the SN Reconfiguration Complete message. However, as CHO is performed on the MN and the execution of the SN configuration is also dependent on whether the triggering condition for the CHO is met, for the target SN it is essentially like a conditional operation. The timer designed for immediate DC operations is likely to expire before receiving the SN Reconfiguration Complete message. The SN then shall regard the requested RRC connection reconfiguration as being not applied by the UE and shall trigger the SN-initiated Release procedure.

Observation 1: The CHO with SCG configuration for the first three scenarios may not function as expected by RAN2 following the current RAN3 specifications unless the timer issue is resolved. For the fourth scenario with both the target MCG and SCG in the same network node, although there is no SN addition procedure in this case, for the UE Context Setup or Modification procedure to be used in the DU serving the SCG, it is not clear whether the Conditional Inter-DU Mobility Information IE shall be used by the CU to indicate that this is for conditional PSCell change. From the liason, it seems that only the MCG part requires a conditional indication while the SCG part does not.

Observation 2: It is not clear whether CU should used the conditional indication in the UE Context management procedure to the DU serving the SCG for the fourth scenario. Last but not least, during RAN2 #109*e* the following has been agreed regarding CHO and CPC in R2-2001764 (R3-201511 LS in): "Support of CHO and CPC-intra-SN configuration simultaneously is not considered in Rel-16. Leave it up to the network solution to ensure there is no simultaneous CHO and CPC configuration. Up to RAN3 if/how to ensure no simultaneous CHO+CPC (e.g. OAM, etc.). As discussed above, essentially the SCG configuration is only executed when the CHO triggering condition is met so that the SN addition part can be considered conditionally (at least for the first three scenarios), this seems to be against another previous RAN2 agreement to avoid simultaneous CHO and CPC configuration.

Observation 3: Support of CHO and CPC-intra-SN-configuration simulataneously is not considered in Rel-16.

Two questions based on these observations are: (1) Is there any RAN3 specification impact if in any of the scenarios listed above the conditional reconfiguration (CHO) with SCG configuration is supported? and (2) Are there any other mobility scenarios, not included above, where conditional reconfiguration with SCG configuration would be possible? Proposed answers to these respective questions are: (1) There could be RAN3 specification impacts such as the timer issue at the target SN for the Release 16, and (2) Seems no.

The following description includes a proposed change to 3GPP TS 36.423 version 16.5.0, in view of the discussion above. Reasons for the change include: RAN2 has agreed that "Upon execution of CPA or MN/SN-initiated inter-SN CPC, UE sends a Reconfiguration Complete message to MN including an embedded Reconfiguration Complete message, that MN forwards to target SN". Therefore, different from CPC in Rel-16, the SgNB Reconfiguration Complete message shall be used in stead of the RRC Message Transfer. As the timer $T_{DCoverall}$ is for the immediate SN Addition or Change procedure and it is uncertain when the CPA or inter-SN CPC will be executed, it shall not be used for the CPA or inter-SN CPC. A summary of the proposed change is: (1) the en-gNB does not start the timer $T_{DCoverall}$ when sending the SGNB ADDITION REQUEST ACKNOWLEDGE message to the MeNB in case of CPA or inter-SN CPC, and (2) the en-gNB does not stop the timer $T_{DCoverall}$ when receiving the SGNB RECONFIGURATION COMPLETE message in case of CPA or inter-SN CPC. Without this proposed change, it is unclear whether the SN shall start (and then stop) the timer $T_{DCoverall}$ for CPA or inter-SN CPC. To implement this change, 3GPP TS 36.423 version 16.5.0 can be modified as follows (with modifications shown with bold and underlining):

Section 8.7.4.2 Successful Operation: Interactions with the SgNB Reconfiguration Completion procedure:

If the en-gNB admits at least one E-RAB, the en-gNB shall start the timer $T_{DCoverall}$ when sending the SGNB ADDITION REQUEST ACKNOWLEDGE message to the MeNB except for the conditional SgNB Addition or the conditional SgNB Change. The reception of the SGNB RECONFIGURATION COMPLETE message shall stop the timer $T_{DCoverall}$ except for the conditional SgNB Addition or the conditional SgNB Change.

Section 8.7.5.2 Successful Operation

Upon reception of the SGNB RECONFIGURATION COMPLETE message the en-gNB shall stop the timer $T_{DCoverall}$ except for the conditional SgNB Addition or the conditional SgNB Change.

The following description includes a proposed change to 3GPP TS 38.423 version 16.5.0, in view of the discussion above. Reasons for the change include: RAN2 has agreed that "Upon execution of CPA or MN/SN-initiated inter-SN CPC, UE sends a Reconfiguration Complete message to MN including an embedded Reconfiguration Complete message, that MN forwards to target SN". Therefore, different from CPC in Rel-16, the SgNB Reconfiguration Complete message shall be used instead of the RRC Message Transfer. As the timer $TXn_{DCoverall}$ is for the immediate SN Addition or Change procedure and it is uncertain when the CPA or inter-SN CPC will be executed, it shall not be used for the CPA or inter-SN CPC. A summary of the proposed change includes: (1) the S-NG-RAN node does not start the timer $TXn_{DCoverall}$ when sending the S-NODE ADDITION REQUEST ACKNOWLEDGE message to the M-NG-RAN node in case of CPA or inter-SN CPC, and (2) the S-NG-RAN node does not stop the timer $TXn_{DCoverall}$ when receiving the S-NODE RECONFIGURATION COMPLETE message in case of CPA or inter-SN. Without this proposed change, it is unclear whether the SN shall start (and then stop) the timer $TXn_{DCoverall}$ for CPA or inter-SN CPC. To implement this change, 3GPP TS 36.423 version 16.5.0 can be modified as follows (with modifications shown with bold and underlining):

Section 8.3.1.2 Successful Operation: Interactions with the S-NG-RAN node Reconfiguration Completion procedure:

If the S-NG-RAN node admits at least one PDU session resource, the S-NG-RAN node shall start the timer $TXn_{DCoverall}$ when sending the S-NODE ADDITION REQUEST ACKNOWLEDGE message to the M-NG-RAN node except for conditional S-NG-RAN node Addition or conditional S-NG-RAN node Change. The reception of the S-NODE RECONFIGURATION COMPLETE message shall stop the timer $TXn_{DCoverall}$ except for conditional S-NG-RAN node Addition or conditional S-NG-RAN node Change.

8.3.2.2 Successful Operation

Upon reception of the S-NODE RECONFIGURATION COMPLETE message the S-NG-RAN node shall stop the timer $TXn_{DCoverall}$ except for conditional S-NG-RAN node Addition or conditional S-NG-RAN node Change.

The following list of examples reflects a variety of the embodiments explicitly contemplated by the present disclosure:

Example 1. A method in a first base station for supporting a secondary node (SN) procedure, the first base station operating as (i) a source SN, (ii) a target SN, or (iii) a candidate SN for the SN procedure, the method comprising: communicating, by processing hardware, a message with a second base station, operating as a master node (MN), to perform the SN procedure; and determining, by the processing hardware, based on whether the SN procedure is a conditional procedure or a non-conditional procedure, whether to start a timer in response to the communicating.

Example 2. The method of example 1, further comprising: in a first instance, starting the timer in response to the communicating, based on determining that the SN procedure is a non-conditional procedure; and in a second instance, refraining from starting the timer in response to the communicating, based on determining that the SN procedure is a conditional procedure.

Example 3. A method in a first base station for supporting a secondary node (SN) procedure for a user equipment (UE), the first base station operating as (i) a source SN, (ii) a target SN, or (iii) a candidate SN for the SN procedure, the method comprising: communicating, by processing hardware, a message with a second base station, operating as a master node (MN), to perform the SN procedure; in response to the communicating, starting, by the processing hardware, a timer; detecting, by the processing hardware, that the timer expires before receiving a notification indicating completion of SN reconfiguration at the UE; and determining, by the processing hardware, based on whether the SN procedure is a conditional procedure or a non-conditional procedure, whether to initiate an SN release procedure in response to the detecting.

Example 4. The method of example 3, further comprising: in a first instance, initiating the SN release procedure in response to the detecting, based on determining that the SN procedure is a non-conditional procedure; and in a second instance, refraining from initiating the SN release procedure in response to the detecting, based on determining that the SN procedure is a conditional procedure.

Example 5. The method of example 3 or 4, wherein the notification is an SN Reconfiguration Complete message.

Example 6. The method of any one of the preceding examples, wherein communicating the message includes receiving an SN request message from the second base station.

Example 7. The method of any one of examples 1-5, wherein communicating the message includes transmitting an SN request acknowledgement message to the second base station.

Example 8. The method of any one of the preceding examples, wherein the SN procedure is an SN addition or change procedure.

Example 9. The method of any one of examples 1-7, wherein the SN procedure is an SN modification procedure.

Example 10. The method of any one of the preceding examples, wherein the timer is a $T_{DCoverall}$ timer or a $TXn_{DCoverall}$ timer.

Example 11. A method in a first base station for supporting a secondary node (SN) procedure for a user equipment (UE), the first base station operating as a master node (MN), the method comprising: communicating, by processing hardware, a message with (i) a second base station, operating as a secondary node (SN), or (ii) the UE, to perform the SN procedure; and determining, by the processing hardware, based on whether the SN procedure is a conditional procedure or a non-conditional procedure, whether to start a timer in response to the communicating.

Example 12. The method of example 11, further comprising: in a first instance, starting the timer in response to the communicating, based on determining that the SN procedure is a conditional procedure; and in a second instance, refraining from starting the timer in response to the communicating, based on determining that the SN procedure is a non-conditional procedure.

Example 13. The method of example 11 or 12, wherein communicating the message includes transmitting an SN request message to the second base station.

Example 14. The method of example 11 or 12, wherein communicating the message includes receiving an SN request acknowledgement message from the second base station.

Example 15. The method of example 11 or 12, wherein communicating the message includes transmitting a configuration to the UE for communicating with the second base station.

Example 16. The method of example 15, wherein: the first base station starts the timer based on determining that the SN procedure is a conditional procedure; and the configuration is a conditional configuration including a condition for applying the conditional configuration.

Example 17. The method of example 16, further comprising: stopping, by the processing hardware, the timer in response to receiving a positive acknowledgement from the UE indicating receipt of the message.

Example 18. The method of example 16, further comprising: detecting, by the processing hardware, that the timer has expired before receiving a positive acknowledgement from the UE indicating receipt of the message; and in response to the detecting, initiating, by the processing hardware, an SN release procedure to cause the second base station to release the configuration.

Example 19. A method in a first base station operating as a master node (MN) for supporting a conditional secondary node (SN) procedure, the method comprising: receiving, by processing hardware from a second base station operating as an SN, an indication that a third base station is to operate as a candidate SN for a UE via a cell associated with the third base station; in response to the indication, transmitting, by the processing hardware to the third base station, a request to configure the cell as a candidate cell; receiving, by the processing hardware, from the third base station, a configuration for communicating with the third base station via the cell; receiving, by the processing hardware, from the second base station, a condition for connecting to the cell; transmitting, by the processing hardware, the configuration with the condition to the UE.

Example 20. The method of example 19, wherein receiving the condition includes receiving the condition with the indication.

Example 21. The method of example 20, wherein the cell is one of a plurality of cells operated by the third base station and configured to operate as candidate cells, the method further comprising: assigning, by the processing hardware, an identifier to each cell of the plurality of cells; and transmitting, by the processing hardware, the identifier assigned to the cell to the UE with the configuration and the condition.

Example 22. The method of any one of examples 19-21, wherein receiving the condition includes receiving the condition formatted in accordance with a protocol that terminates at the UE and the SN.

Example 23. The method of example 22, further comprising: generating, by the processing hardware, an information element (IE) including the configuration and the condition, the IE formatted in accordance with a protocol that terminates at the UE and the MN, wherein transmitting the configuration with the condition includes transmitting the IE to the UE.

Example 24. The method of example 19, further comprising: after receiving the configuration from the third base station and prior to transmitting the configuration to the UE, transmitting, by the processing hardware, the configuration to the second base station, wherein receiving the condition includes receiving the condition with the configuration from the second base station.

Example 25. The method of example 24, wherein: receiving the condition and receiving the configuration from the second base station includes receiving an information element (IE) including the configuration and the condition; and transmitting the configuration with the condition includes transmitting the IE to the UE.

Example 26. The method of example 25, wherein the IE is formatted in accordance with a protocol that terminates at the UE and the SN.

Example 27. The method of any one of examples 19-26, further comprising:

determining, by the processing hardware, to release the second base station as the SN; and in response to determining to release the second base station, transmitting, by the processing hardware, an SN release request to the third base station.

Example 28. The method of any one of examples 19-27, further comprising:

determining, by the processing hardware, to modify an SN configuration via which the UE communicates with the second base station; in response to determining to modify the SN configuration, transmitting, by the processing hardware to the third base station, a request to modify the configuration.

Example 29. The method of example 28, further comprising: requesting a modified SN configuration from the second base station; receiving the modified SN configuration from the second base station; transmitting the modified SN configuration to the third base station in the request.

Example 30. The method of any one of examples 19-27, further comprising:

receiving a first request from the second base station to modify or remove at least a portion of the one or more configurations; and transmitting a second request to the third base station to modify or remove at least a portion of the one or more configurations.

Example 31. The method of example any one of examples 19-30, further comprising: receiving, from the third base station, a modified configuration for communicating with the third base station via the cell; and transmitting the modified configuration to the UE.

Example 32. A method in a second base station operating as a secondary node (SN) for supporting a conditional SN procedure, the method comprising: determining, by processing hardware, to configure a third base station, operating a cell, as a candidate SN for a UE; in response to the determining, transmitting, by the processing hardware, an indication of the cell to a first base station operating as a master node (MN); receiving, by the processing hardware, a configuration for communicating with the third base station via the cell; generating, by the processing hardware, a condition for connecting to the cell; and transmitting, by the processing hardware to the UE via the first base station, an information element (IE) including the condition and the configuration.

Example 33. The method of example 32, further comprising: formatting the IE in accordance with a protocol that terminates at the UE and the SN.

Example 34. The method of example 32 or 33, wherein the cell is one of a plurality of cells operated by the third base station and configured to operate as candidate cells, further comprising: assigning, by the processing hardware, an identifier to each cell of the plurality of cells; and including, in the IE, the identifier assigned to the cell.

Example 35. The method of any one of examples 32-34, further comprising:

determining, by the processing hardware, to modify the configuration; and transmitting, by the processing hardware, a request to modify the configuration to the first base station.

Example 36. The method of any one of examples 32-25, wherein receiving the configuration includes receiving the configuration from the first base station.

Example 37. A method in a first base station operating as a master node (MN) for supporting a conditional secondary node (SN) procedure, the method comprising: determining, by processing hardware, that a second base station is to operate as a candidate SN for a UE, the second base station operating a plurality of cells; in response to the determining, transmitting, by the processing hardware to the second base station, a request to configure the plurality of cells as a respective plurality of candidate cells; receiving, by the processing hardware, from the second base station, (i) one or more configurations for communicating with the second base station via one or more respective candidate cells of the plurality of cells and (ii) an indication of which cells of the plurality of cells the second base station configured as candidate cells; and transmitting, by the processing hardware, the one or more configurations to the UE.

Example 38. The method of example 37, wherein receiving the indication includes: receiving one or more cell identifiers corresponding to the one or more respective candidate cells.

Example 39. The method of example 37 or 38, further comprising: receiving, by the processing hardware, from a third base station operating as an SN, a message indicating that the second base station is to operate as the candidate SN, wherein the determining is in response to receiving the message.

Example 40. The method of example 39, wherein the message is a first message, the method further comprising: transmitting, by the processing hardware, to the third base station, a second message indicating the one or more candidate cells of the plurality of cells that the second base station configured as candidate cells.

Example 41. The method of example 40, wherein transmitting the second message includes: transmitting at least one of an SN change confirm message or an SN modification request message.

Example 42. The method of any one of examples 37-39, further comprising:

transmitting, by the processing hardware, to the second base station, a request to modify at least a portion of the one or more configurations; and receiving, by the processing hardware, from the second base station, a response to the request including an one or more modified configurations and indicating to which candidate cells of the one or more candidate cells the one or more modified configurations correspond.

Example 43. The method of example 42, wherein transmitting the request includes: transmitting an SN modification request message.

Example 44. A base station including processing hardware and configured to implement a method according to any one of the preceding examples.

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IOT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method implemented in a first base station for supporting a secondary node (SN) procedure, the first base station operating as (i) a source SN, (ii) a target SN, or (iii) a candidate SN for the SN procedure, the method comprising:

communicating a message with a second base station, operating as a master node (MN), to perform the SN procedure; and in response to determining that the SN procedure is a conditional procedure, refrain from starting, in response to the communicating, a timer that controls an SN reconfiguration.

2. The method of claim 1, further comprising:

in a second instance, in response to determining that the SN procedure is a non-conditional procedure, starting the timer in response to the communicating.

3. The method of claim 1, further comprising:

receiving a notification indicating completion of SN reconfiguration at the UE; and in response to receiving the notification, stopping the timer if the timer is running.

4. The method of claim 3, wherein receiving the notification includes:

receiving an SN Reconfiguration Complete message.

5. The method of claim 1, wherein communicating the message includes:

transmitting an SN request acknowledgement message to the second base station.

6. The method of claim 5, wherein transmitting the SN request acknowledgement message includes:

transmitting an SN Addition Request Acknowledge message.

7. The method of claim 5, wherein transmitting the SN request acknowledgement message includes:

transmitting an SGNB ADDITION REQUEST ACKNOWLEDGE message or an S-NODE ADDITION REQUEST ACKNOWLEDGE message.

8. The method of claim 5, wherein transmitting the SN request acknowledge message includes:

transmitting an SN Modification Request Acknowledge message.

9. The method of claim 1, wherein the SN procedure is an SN addition or change procedure.

10. The method of claim 1, wherein the SN procedure is an SN modification procedure.

11. The method of claim 1, wherein the timer is a $T_{DCoverall}$ timer or a $TXn_{DCoverall}$ timer.

12. The method of claim 1, wherein:

the refraining from starting the timer is further in response to determining that the conditional procedure is an SN-initiated conditional procedure.

13. A base station configured to operate as a source secondary node (SN), a target SN, or a candidate SN for an SN procedure, the base station including processing hardware and configured to:

communicate a message with a second base station, operating as a master node (MN), to perform the SN procedure; and in response to determining that the SN procedure is a conditional procedure, refrain from starting, in response to the communicating, a timer that controls an SN reconfiguration.

14. The base station of claim 13, further configured to:

in a second instance, in response to determining that the SN procedure is a non-conditional procedure, start the timer in response to the communicating.

15. The base station of claim 13, further configured to:

receive a notification indicating completion of SN reconfiguration at the UE; and in response to receiving the notification, stop the timer if the timer is running.

16. The base station of claim 13, wherein to communicate the message, the base station is configured to:

transmit an SN request acknowledgement message to the second base station.

17. The base station of claim 13, wherein the SN procedure is an SN addition or change procedure.

18. The base station of claim 13, wherein the SN procedure is an SN modification procedure.

19. The base station of claim 13, wherein the timer is a TDCoverall timer or a TXnDCoverall timer.

20. The base station of claim 13, wherein:

the refraining from starting the timer is further in response to determining that the conditional procedure is an SN-initiated conditional procedure.

* * * * *